(12) United States Patent
Fasciano

(10) Patent No.: US 7,620,636 B2
(45) Date of Patent: Nov. 17, 2009

(54) METHOD AND APPARATUS FOR COLLECTING AND STORING INFORMATION ABOUT INDIVIDUALS IN A CHARITABLE DONATIONS SOCIAL NETWORK

(75) Inventor: Mark Joseph Fasciano, Port Washington, NY (US)

(73) Assignee: Stay Awake Inc., Port Washington, NY (US)

( * ) Notice: Subject to any disclaimer, the term of this patent is extended or adjusted under 35 U.S.C. 154(b) by 0 days.

(21) Appl. No.: 11/328,752

(22) Filed: Jan. 10, 2006

(65) Prior Publication Data

US 2007/0162458 A1 Jul. 12, 2007

(51) Int. Cl.
*G06F 17/30* (2006.01)
*G06Q 20/00* (2006.01)

(52) U.S. Cl. .............................. 707/10; 707/1; 707/200; 705/35; 705/43

(58) Field of Classification Search ............ 705/8–9.26, 705/39–40, 35, 43; 709/220–225; 707/1–2, 707/10, 200, 100
See application file for complete search history.

(56) References Cited

U.S. PATENT DOCUMENTS

| | | |
|---|---|---|
| 5,796,393 A | 8/1998 | MacNaughton et al. |
| 5,887,273 A * | 3/1999 | Ziarno ......................... 705/39 |
| 5,920,847 A | 7/1999 | Kolling et al. |
| 6,175,831 B1 | 1/2001 | Weinreich et al. |
| 6,421,669 B1 | 7/2002 | Gilmour et al. |
| 6,581,041 B1 * | 6/2003 | Canney ................... 705/36 R |

(Continued)

FOREIGN PATENT DOCUMENTS

| | | | |
|---|---|---|---|
| WO | WO 02/056129 | * | 7/2002 |
| WO | WO 03/053124 | * | 7/2003 |

OTHER PUBLICATIONS

Keith C.C. Chan et al. "Mining Fuzzy Rules in A Donor Database for Direct Marketing by A Charitable Organization",Proceedings of the First IEEE International Conference on Cognitive Informatics (ICCI'02), IEEE 2002, 8 pages.*

(Continued)

*Primary Examiner*—Srirama Channavjjala
(74) *Attorney, Agent, or Firm*—Robert T. Maldonado; Tonia A. Sayour; Cooper & Dunham LLP

(57) ABSTRACT

Method and apparatus for collecting and storing information about individuals in a social network. A member account is created by verifying a user's identity and collecting user identity data from the user. The user sends an invitation to one or more members or non-members. The one or more members or non-members can accept or decline the user's invitation. If the one or more non-members accept or decline, they must create a member account. The one or more members post paid comments or free comments about the user and one or more user weight values are calculated based on one or more of the following: a number of members in a user's group and their one or more user weight values, a total value of posted paid comments about the user and volume of posted comments about the user. The user can post a reply to the posted comment by the one or more members.

27 Claims, 21 Drawing Sheets

U.S. PATENT DOCUMENTS

| | | | |
|---|---|---|---|
| 6,807,566 B1 | 10/2004 | Bates et al. | |
| 7,047,030 B2* | 5/2006 | Forsyth | 455/518 |
| 7,069,308 B2 | 6/2006 | Abrams | |
| 7,159,178 B2 | 1/2007 | Vogt et al. | |
| 7,231,353 B1* | 6/2007 | Goyal | 705/1 |
| 7,321,876 B1* | 1/2008 | Wolfston | 705/39 |
| 7,448,534 B2* | 11/2008 | Stremler et al. | 235/376 |
| 7,472,073 B1* | 12/2008 | Masi | 705/14 |
| 2002/0120757 A1 | 8/2002 | Sutherland et al. | |
| 2002/0174063 A1* | 11/2002 | Major | 705/39 |
| 2003/0028595 A1* | 2/2003 | Vogt et al. | 709/204 |
| 2003/0167177 A1* | 9/2003 | Branch | 705/1 |
| 2004/0133440 A1 | 7/2004 | Carolan et al. | |
| 2004/0189476 A1 | 9/2004 | Borovoy et al. | |
| 2004/0259641 A1 | 12/2004 | Ho | |
| 2005/0004867 A1* | 1/2005 | Spector | 705/39 |
| 2005/0021750 A1* | 1/2005 | Abrams | 709/225 |
| 2005/0055232 A1 | 3/2005 | Yates | |
| 2005/0131894 A1 | 6/2005 | Vuong | |
| 2005/0149397 A1 | 7/2005 | Morgenstern et al. | |
| 2005/0154639 A1* | 7/2005 | Zetmeir | 705/14 |
| 2005/0159998 A1 | 7/2005 | Buyukkokten et al. | |
| 2005/0160094 A1 | 7/2005 | Morgenstern et al. | |
| 2005/0165785 A1 | 7/2005 | Malkin et al. | |
| 2005/0174975 A1 | 8/2005 | Mgrdechian et al. | |
| 2005/0177614 A1 | 8/2005 | Bourne | |
| 2005/0193054 A1 | 9/2005 | Wilson et al. | |
| 2005/0198299 A1 | 9/2005 | Beck et al. | |
| 2005/0203801 A1 | 9/2005 | Morgenstern et al. | |
| 2005/0209999 A1 | 9/2005 | Jou | |
| 2005/0210409 A1 | 9/2005 | Jou | |
| 2005/0216300 A1 | 9/2005 | Appelman et al. | |
| 2005/0216550 A1 | 9/2005 | Paseman et al. | |
| 2005/0234781 A1 | 10/2005 | Morgenstern et al. | |
| 2005/0235062 A1 | 10/2005 | Lunt et al. | |
| 2005/0240433 A1* | 10/2005 | Schwartz et al. | 705/1 |
| 2005/0240531 A1* | 10/2005 | Wolff | 705/53 |
| 2005/0251485 A1* | 11/2005 | Quigley | 705/53 |
| 2005/0272413 A1 | 12/2005 | Bourne | |
| 2006/0004590 A1 | 1/2006 | Khoo | |
| 2006/0009994 A1 | 1/2006 | Hogg et al. | |
| 2006/0042483 A1* | 3/2006 | Work et al. | 101/91 |
| 2006/0048059 A1 | 3/2006 | Etkin | |
| 2006/0080161 A1 | 4/2006 | Arnett et al. | |
| 2006/0085259 A1 | 4/2006 | Nicholas et al. | |
| 2006/0122974 A1 | 6/2006 | Perisic | |
| 2006/0123127 A1 | 6/2006 | Littlefield | |
| 2006/0143066 A1 | 6/2006 | Calabria | |
| 2006/0143067 A1* | 6/2006 | Calabria | 705/10 |
| 2006/0143068 A1 | 6/2006 | Calabria | |
| 2006/0190281 A1 | 8/2006 | Kott et al. | |
| 2006/0190829 A1 | 8/2006 | Zaner et al. | |
| 2006/0212390 A1* | 9/2006 | Gruber | 705/40 |
| 2006/0265277 A1 | 11/2006 | Yasinovsky et al. | |
| 2006/0271460 A1 | 11/2006 | Hanif | |
| 2007/0078675 A1 | 4/2007 | Kaplan | |

OTHER PUBLICATIONS

Magne Supphellen et al. "Developing, exploring, and validating a typology of private philanthropic decision making", Journal of Economic Psychology, 22 (2001) pp. 573-603.*

Friendster Launches Free Blogs Service Featuring Six Apart's TypePad Software, Press Release, Mar. 3, 2005.

LinkedIn Launches Premium Service for Recruiters and Researchers, Press Release, Aug. 8, 2005, Palo Alto, California.

Melissa Solomon, Six Degrees To Connection, Biztech, Aug. 2005.

Paul Festa, Friendster Investors Fall Out Over.Patent, ZDNet, Nov. 12, 2003.

Alan S. Horowitz, Social Software: Corporate and Web-based Networking Software helps people make critical business connections (Social Networking Technology); Sep. 2005.

Ina O'Murchu, John G. Breslin, Stefan Decker, Online Social and Business Networking Communities, DERI Technical Report, Aug. 11, 2004.

Thomas Claburn, Social Networks Go Pro, 2006.

Social Networks Research Report, Wildbit, Jul. 25, 2005.

Wink Launches First Social Network Search Engine, Nov. 16, 2006.

* cited by examiner

METHOD AND APPARATUS FOR COLLECTING AND STORING INFORMATION ABOUT INDIVIDUALS IN A CHARITABLE DONATIONS SOCIAL NETWORK

BACKGROUND

1. Field of the Invention

The present disclosure relates generally to social networking and, more particularly, to a method and apparatus for collecting and storing reliable information about individuals in a social network.

2. Background of the Invention

The Internet provides enterprises and individuals with the ability to communicate with a world-wide audience. In the past few years, there has been an explosion in the popularity and volume of use of the Internet, facilitating interaction among individuals. A number of services have been developed and offered over the years which allow individuals to network socially over the Internet for specific purposes. For example, some services such as Match.com and eHarmony match individuals for dating purposes, while other services such as Friendster and LinkedIN match individuals for social and business networking purposes.

These existing services have a specific purpose of connecting people to help facilitate introductions and personal networking. There is a need, however, that remains unfulfilled by these existing services, a need for universal services that provide reliable and trustworthy information about individuals, such as reliable and trustworthy feedback on issues important to others. Accordingly, there is a need for a universal service that provides users with reliable and trustworthy information about individuals.

SUMMARY OF THE INVENTION

This application describes methods and apparatuses for collecting and storing information about individuals in a social network. A method for collecting and storing information about individuals in a social network, according to one embodiment of the present disclosure, includes creating a member account by verifying a user's identity and collecting user identity data from the user, allowing the user to send an invitation to one or more members or non-members, allowing the one or more members or non-members to accept or decline the user's invitation, wherein the one or more non-members must create a member account in order to accept or decline the user's invitation, allowing one or more members to post paid comments or free comments about the user, calculating one or more user weight values based on one or more of the following: a number of members in a user's group and their one or more user weight values, a total value of posted paid comments about the user and volume of posted comments about the user, and allowing the user to post a reply to the posted comment by the one or more members.

An apparatus for collecting and storing information about individuals in a social network, according to one embodiment of the present disclosure, includes creating means for creating a member account by verifying a user's identity and collecting means for collecting user identity data from the user, first allowing means for allowing the user to send an invitation to one or more members or non-members, second allowing means for allowing the one or more members or non-members to accept or decline the user's invitation, wherein the one or more non-members must create a member account in order to accept or decline the user's invitation, third allowing means for allowing one or more members to post paid comments or free comments about the user, calculating means for calculating one or more user weight values based on one or more of the following: a number of members in a user's group and their one or more user weight values, a total value of posted paid comments about the user and volume of posted comments about the user, and fourth allowing means for allowing the user to post a reply to the posted comment by the one or more members.

The methods and apparatuses of this disclosure may be embodied in one or more computer programs stored on a computer readable medium or program storage device and/or transmitted via a computer network or other transmission medium. For example, a computer storage medium including computer executable code for collecting and storing information about individuals in a social network, according to one embodiment of the present disclosure, includes code for creating a member account by verifying a user's identity and collecting user identity data from the user, code for allowing the user to send an invitation to one or more members or non-members, code for allowing the one or more members or non-members to accept or decline the user's invitation, wherein the one or more non-members must create a member account in order to accept or decline the user's invitation, code for allowing one or more members to post paid comments or free comments about the user, code for calculating one or more user weight values based on one or more of the following: a number of members in a user's group and their one or more user weight values, a total value of posted paid comments about the user and volume of posted comments about the user, and code for allowing the user to post a reply to the posted comment by the one or more members.

BRIEF DESCRIPTION OF THE DRAWINGS

The features of the present application can be more readily understood from the following detailed description with reference to the accompanying drawings wherein.

DETAILED DESCRIPTION OF THE PREFERRED EMBODIMENTS

Figure 1:
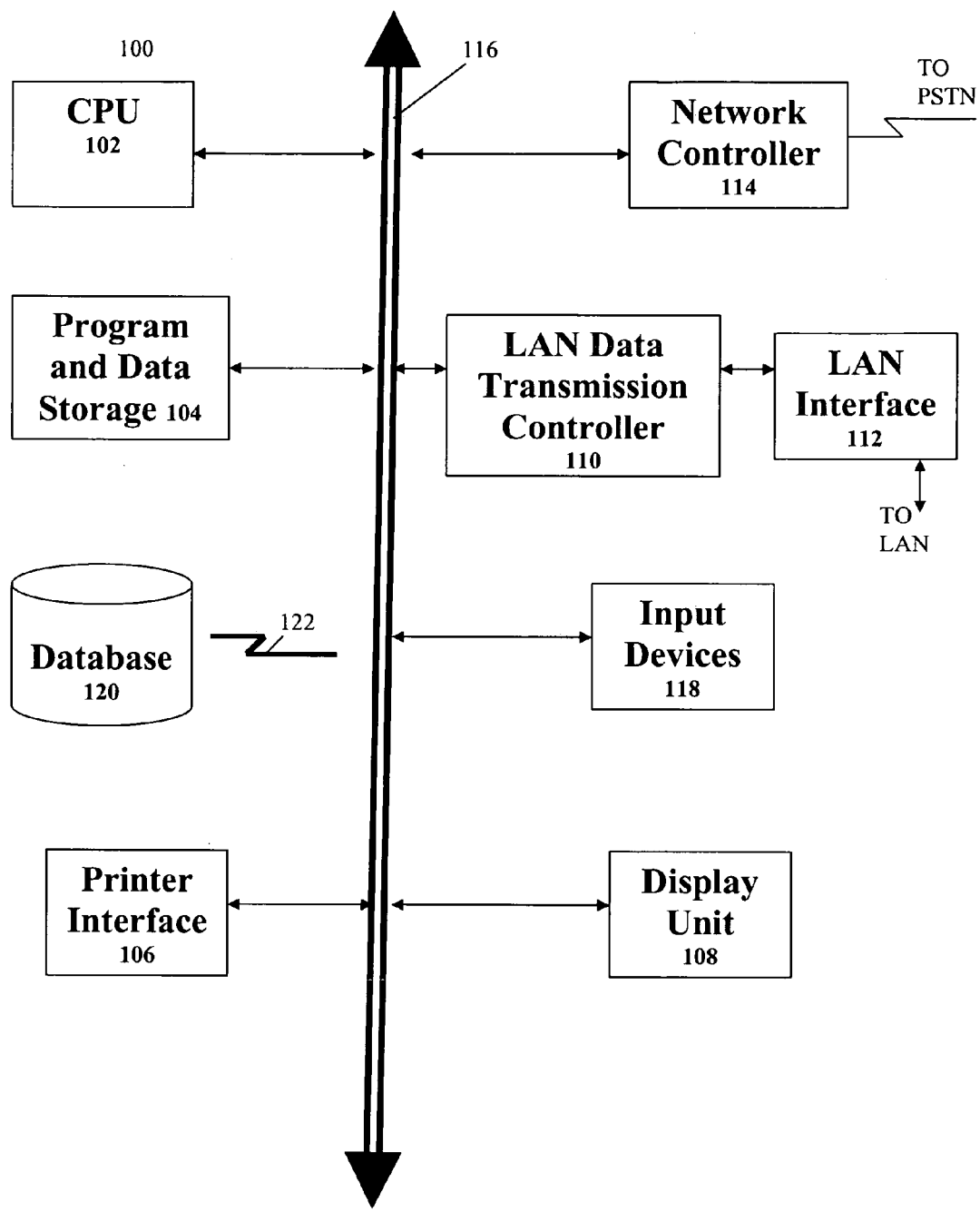
FIG. 1 shows a block diagram of an exemplary computer system capable of implementing the methods and apparatuses of the present disclosure.

The present disclosure provides tools (in the form of methodologies, apparatuses, and systems) for collecting and storing information about individuals in a social network. FIG. 1 shows an example of a computer system 100 which may implement the methods and apparatuses of the present disclosure. The apparatuses and methods of the present disclosure may be implemented in the form of a software application running on a computer system, for example, a mainframe, personal computer (PC), handheld computer, server, etc. The software application may be stored on a recording medium locally accessible by the computer system, for example, floppy disk, compact disk, hard disk, etc., or may be remote from the computer system and accessible via a hard wired or wireless connection to a network, (for example, a local area network, or the Internet, etc) or another transmission medium.

The computer system 100 may include a central processing unit (CPU) 102, program and data storage devices 104, a printer interface 106, a display unit 108, a (LAN) local area network data transmission controller 110, a LAN interface 112, a network controller 114, an internal bus 116, and one or more input devices 118 (for example, a keyboard, mouse etc.). As shown, the system 100 may be connected to a database 120, via a link 122.

Obtaining information about individuals is valuable to employers, prospective employers, universities, and other individuals. This information allows for the assessment of an individual's character, reputation and personality, especially if the individual is a potential employee or mate. This information is most helpful if it is reliable.

Figure 2A:
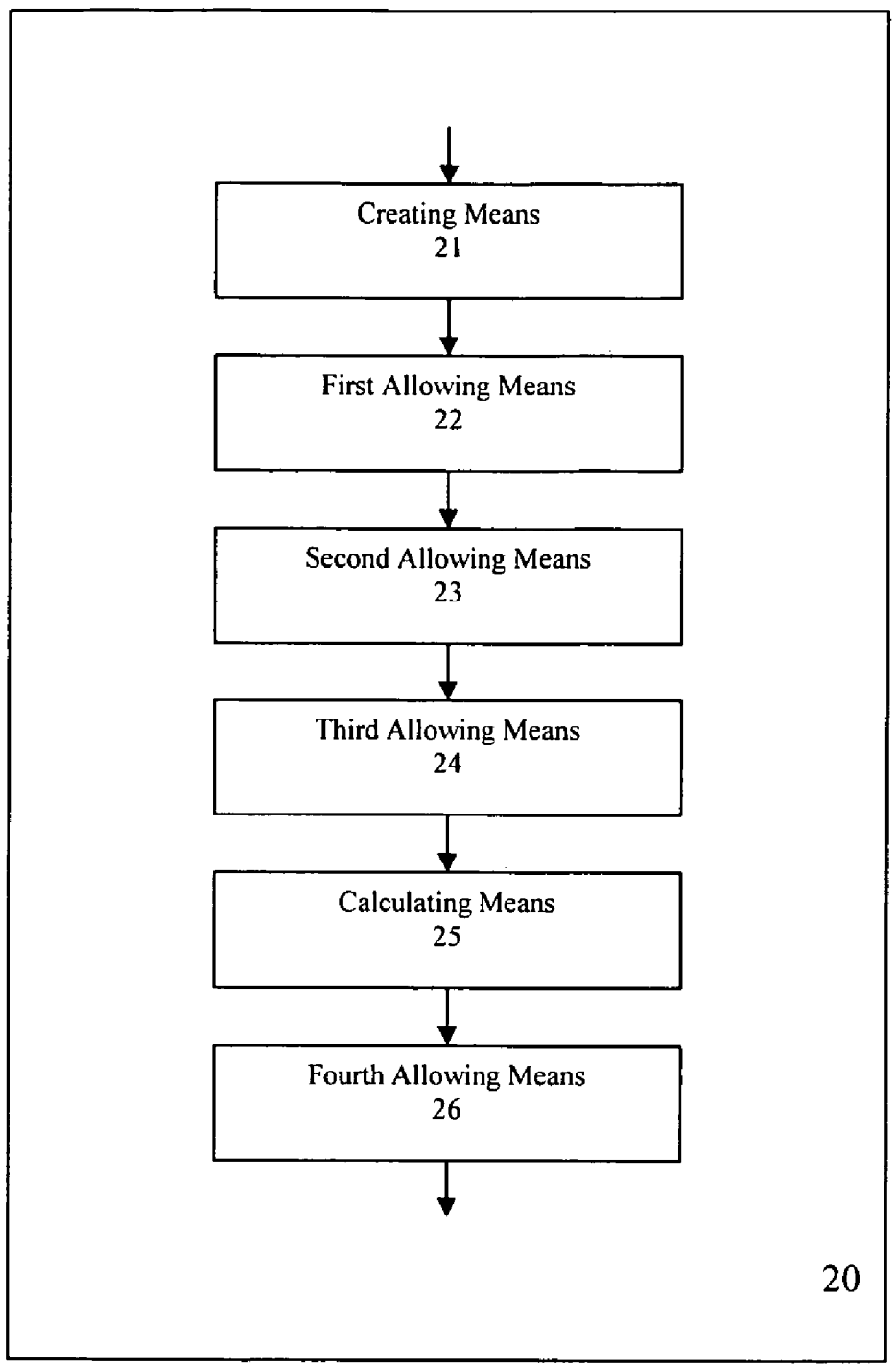
FIG. 2A shows a block diagram illustrating an apparatus for collecting and storing information about individuals in a social network, according to one embodiment of the present disclosure.

An apparatus for collecting and storing information about individuals in a social network, according to one embodiment of this disclosure, will be discussed below with reference to FIG. 2A. The apparatus 20 includes creating means 21, first allowing means 22, second allowing means 23, third allowing means 24, calculating means 25, and fourth allowing means 26.

Figure 2B:
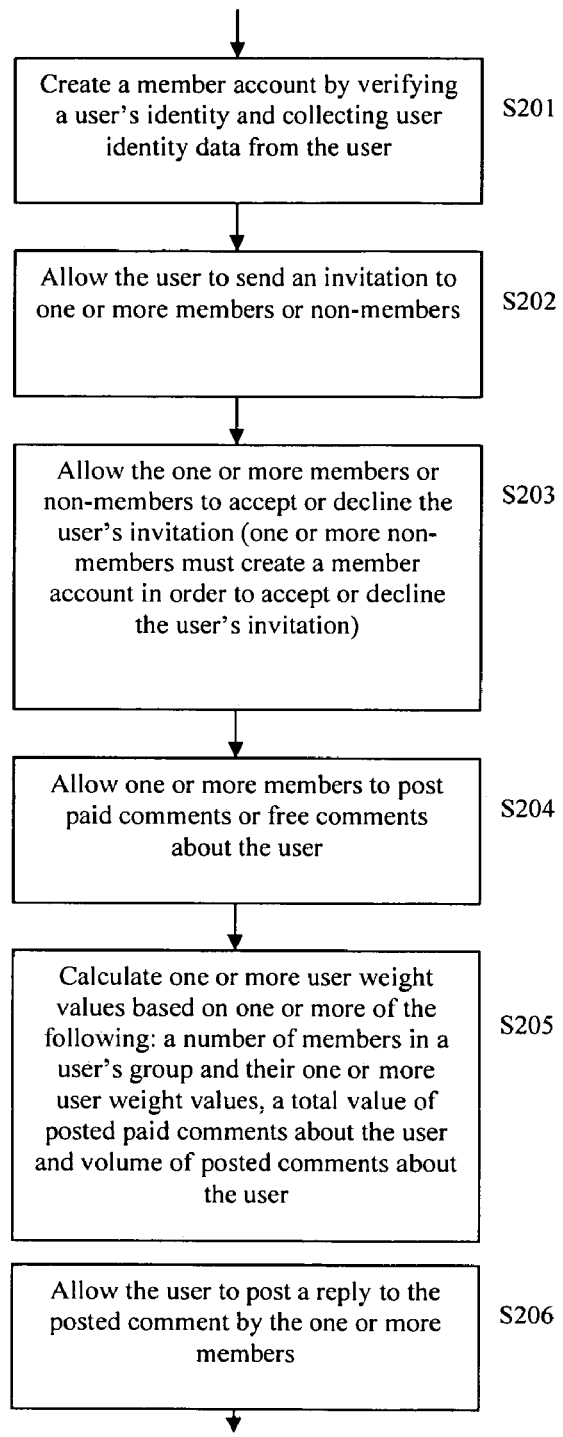
FIG. 2B shows a flow chart illustrating a method for collecting and storing information about individuals in a social network, according to one embodiment of the present disclosure.

A method for collecting and storing information about individuals in a social network, will be explained below with reference to FIGS. 2A and 2B. The creating means 21 creates a member account by verifying a user's identity and collecting user identity data from the user (Step S201). The first allowing means 22 allows the user to send an invitation to one or more members or non-members (Step S202). The invitation can be one or more of the following: an invitation to join a user's group, an invitation to create a member account, an invitation to post free comments, or an invitation to post paid comments. The second allowing means 23 allows the one or more members or non-members to accept or decline the user's invitation, wherein the one or more non-members must create a member account in order to accept or decline the user's invitation (Step S203). The third allowing means 24 allows one or more members to post paid comments or free comments about the user (Step S204). For example, a user can send an invitation to post paid comments to a member that states, "if you post paid comments about me, I will post paid comments about you." The calculating means 25 calculates one or more user weight values based on one or more of the following: a number of members in a user's group and their one or more user weight values, a total value of posted paid comments about the user and volume of posted comments about the user (Step S205). The fourth allowing means 26 allows the user to post a reply to the posted comment by the one or more members (Step S206).

Figure 3:
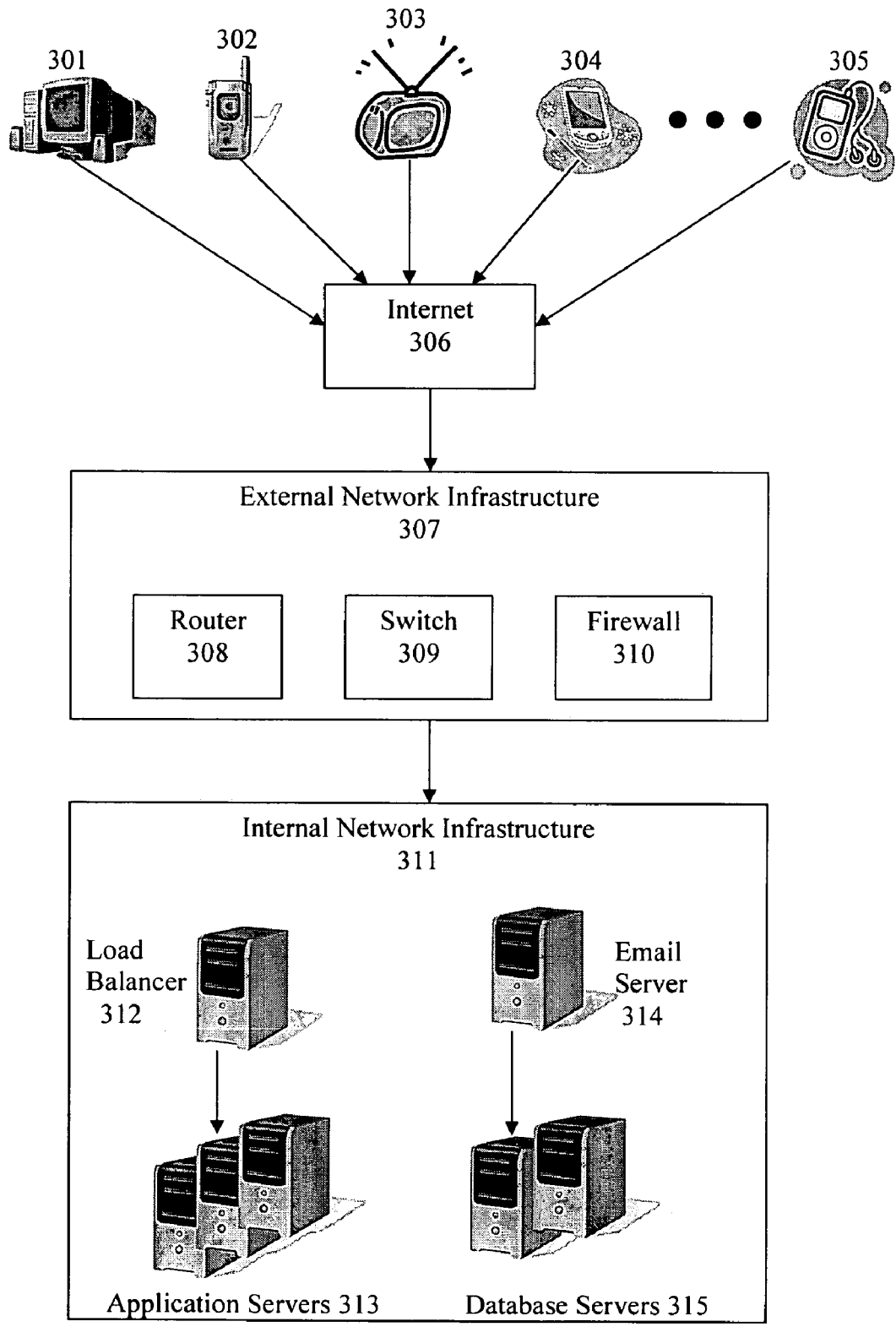
FIG. 3 shows a block diagram illustrating the general architecture of a system that operates in accordance with one embodiment of the present disclosure.

FIG. 3 is a block diagram illustrating the general architecture of a system that operates in accordance with one embodiment of the present disclosure. A plurality of user interface devices 301-305 are connected to the Internet 306. The user interface devices 301-305 may be any device capable of presenting data, including, but not limited to computers, laptops, television sets, mp3 players, cellular telephones, or personal digital assistants. The Internet 306 is connected to the external network infrastructure 307 which comprises a router 308, a switch 309 and a firewall 310. The router 308 forwards packets between the internal network infrastructure 311 and the user interface devices 301-305 over the Internet 306. The switch 309 acts as a gatekeeper to and from the Internet 306. The firewall 310 shields the internal network infrastructure 311 from unauthorized access through the Internet 306. The external network infrastructure 307 is connected to the internal network infrastructure 311, which comprises a load balancer 312, an email server 314, one or more application servers 313, and one or more database servers 315. The load balancer 312 balances the traffic load across the one or more application servers 313. The email server 314 sends, receives and stores electronic messages to and from the user interface devices 301-305.

Figure 4:
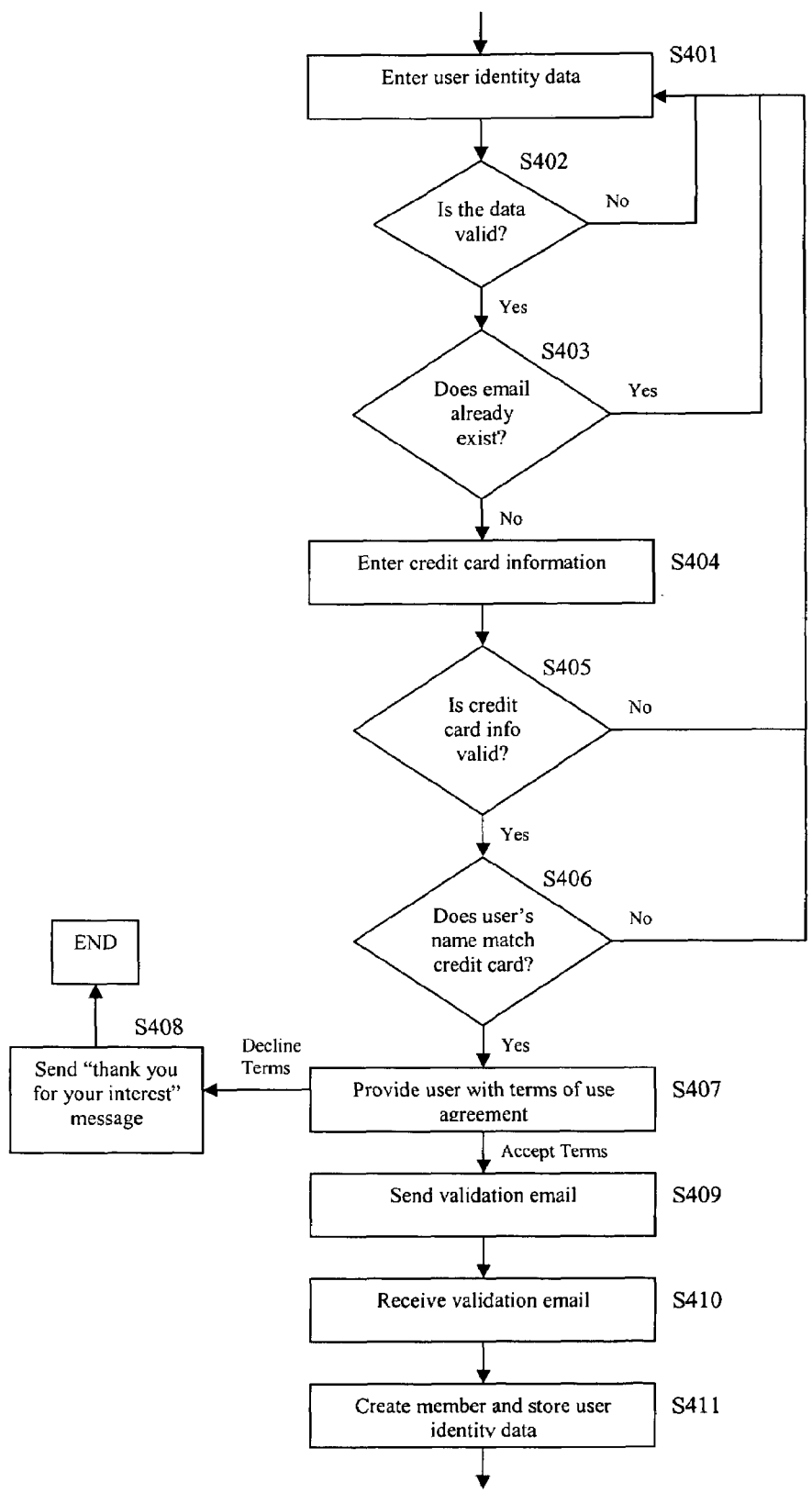
FIG. 4 shows a flow chart illustrating the step of creating a new member account, according to one embodiment of the present disclosure.

FIG. 4 is a flow chart illustrating the step of creating a new member account, according to an embodiment of the present disclosure. The user enters his/her user identity data (Step S401) and the system checks to see if the user identity data is valid (Step S402). For example, the system checks the user's entry to verify that the syntax is correct and/or that there is no information missing from any required field. According to an embodiment of the present disclosure, the user identity data may include the user's full name, email address, nickname, date of birth, home address, work address, high school, college, degree, place of employment, work history, maiden name, country, or any information that the user includes to identify themselves. If the user identity data is not valid (No, Step S402), then the system loops back to Step S401. If the user identity data is valid (Yes, Step S402), then the system checks to see if the user's email address already exists (Step S403). If the email address exists (Yes, Step S403), the system loops back to the sign-in screen at Step S401 and the user re-enters the user identity data. If the email does not exist (No, Step S403), the user enters his/her credit card information (Step S404). The system then checks to see if the credit card information is valid (Step S405). If the user's credit card is not valid (No, Step S405), the system loops back to Step S401.

If the user's credit card is valid (Yes, Step S405), the system checks to see if the user's name matches the name on the user's credit card (Step S406). According to an embodiment of the present disclosure, verifying a user's identity comprises a zero-value transaction on a credit card owned by the user. If a minor seeks access to the system, the child's parent or guardian must explicitly approve the minor's use of the system, and the system conducts a zero-value transaction on a credit card owned by a parent or guardian with the same last name as the minor. If the names do not match (No, Step S406), the system loops back to Step S401. If the names match (Yes, Step S406), the system provides the user with an agreement outlining the terms of use (Step S407). If the user declines to accept the terms, the system sends the user a "thank you for your interest" message and exits (Step S408). However, if the user accepts the terms, the system sends the user a validation email (Step S409). After this validation email is received (Step S410), the member is created and the user identity data is stored in the repository (Step S411). According to an embodiment of the present disclosure, with a credit card, a user may deposit a specified amount of money into his/her account and use that money to post comments and/or pay members for responding to polls. Accordingly, the member account may comprise the charities a user has contributed to and/or the account balance.

Figure 5:
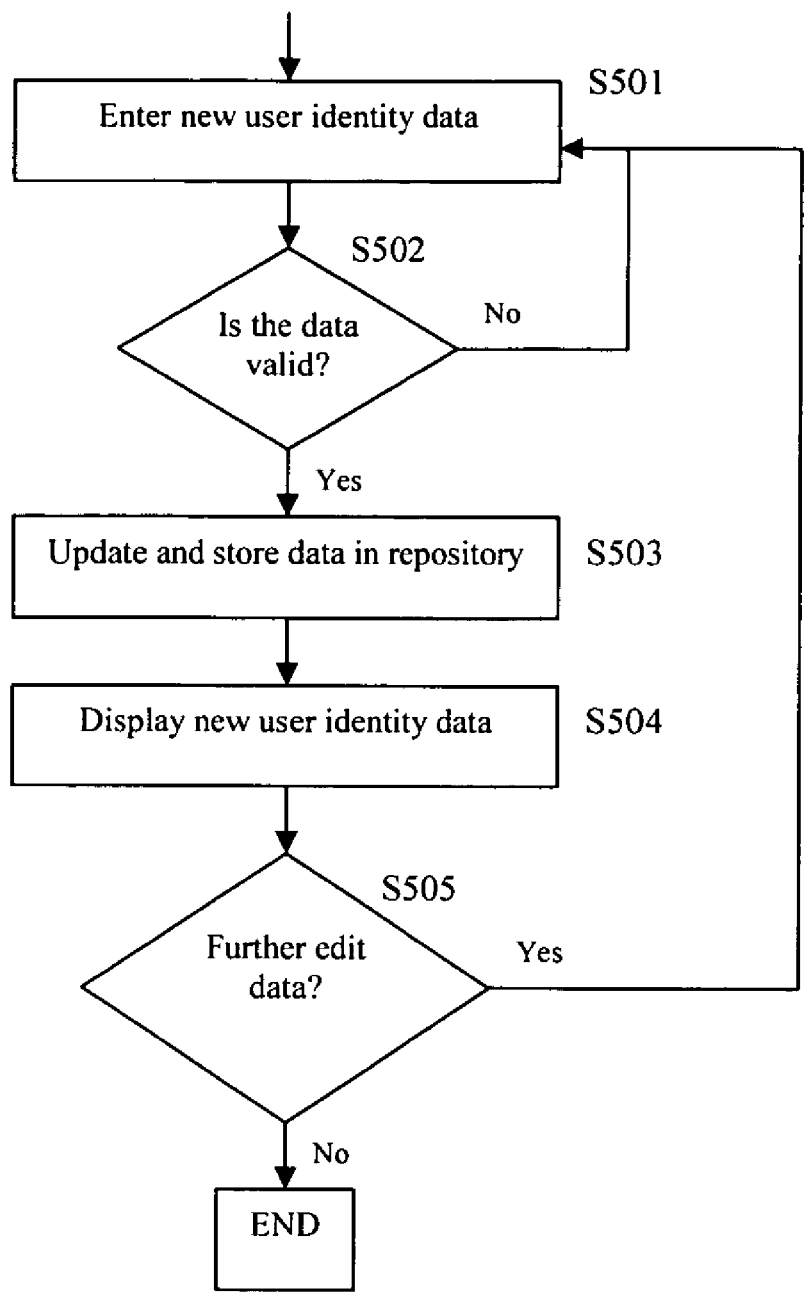
FIG. 5 shows a flow chart illustrating the process of editing user identity data after it is entered, according to one embodiment of the present disclosure.

According to an embodiment of the present disclosure, a user can edit his/her user identity data after it is entered. FIG. 5 illustrates this process. A user can enter the new user identity data (Step S501) and the system will check to see if input is valid (Step S502). For example, the system may check the user's entry to verify that the syntax is correct and/or that there is no information missing from any required field. If the input is not valid (No, Step S502), the system will loop back to Step S501. However, if the input is valid (Yes, Step S502), the system will update and store the data in a repository (Step S503). The system can display the new user identity data (Step S504) and allow the user to further edit the data (Step S505). If the user chooses to edit the data again (Yes, Step S505), the system loops back to Step S501. However, if the user chooses not to further edit the information (No, Step S505), the process ends.

Figure 6:
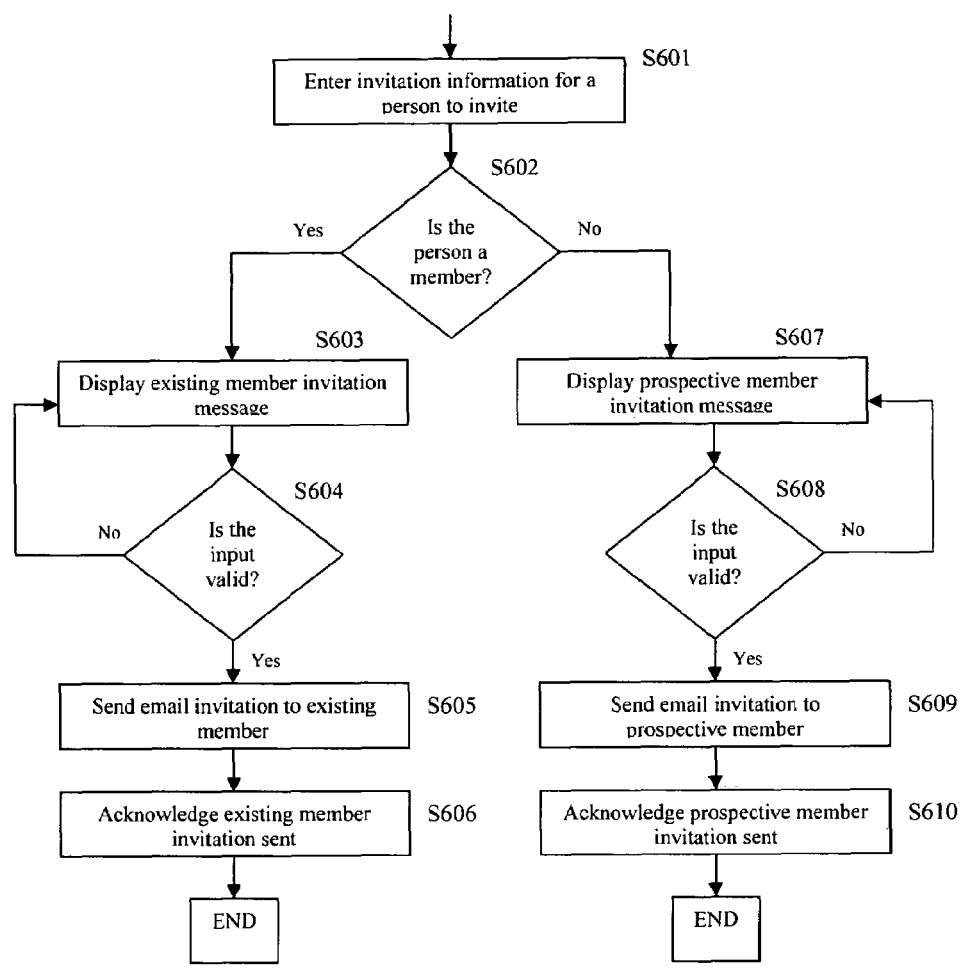
FIG. 6 shows a flow chart illustrating the step of allowing the user to send an invitation to one or more members or non-members to join the user's group, according to one embodiment of the present disclosure.

A user can invite members and non-members to join his/her user group. An invitation can be sent by email or any other means of notification, such as mail, text message, fax, or phone. FIG. 6 is a flow chart illustrating the step of allowing the user to send an invitation to one or more members or non-members to join the user's group, according to an embodiment of the present disclosure. The user enters invitation information for a person (Step S601) and the system checks to see if the person is a member (Step S602). If the person is a member (Yes, Step S602), an "existing member invite message" can be displayed to send to the member (Step S603). According to an embodiment of the present disclosure, the message may be automatically input by the system or manually input by the user. The system checks to see if the input is valid (Step S604). If the input is not valid (No, Step S604), the system loops back to Step S603. If the input is valid (Yes, Step S604), the system sends an email invitation to the existing member (Step S605) and acknowledges that the invitation was sent (Step S606). However, if the person is not a member (No, Step S602), the "prospective member invitation" message can be displayed to send to the prospective member (Step S607). According to an embodiment of the present disclosure, the message may be automatically input by the system or manually input by the user. The system checks to see if the input is valid (Step S608). If the input is not valid (No, Step S608), the system loops back to Step S607. If the input is valid (Yes, Step S608), the system sends an email invitation to the prospective member (Step S609) and acknowledges that the invitation was sent (Step S610).

Figure 7:
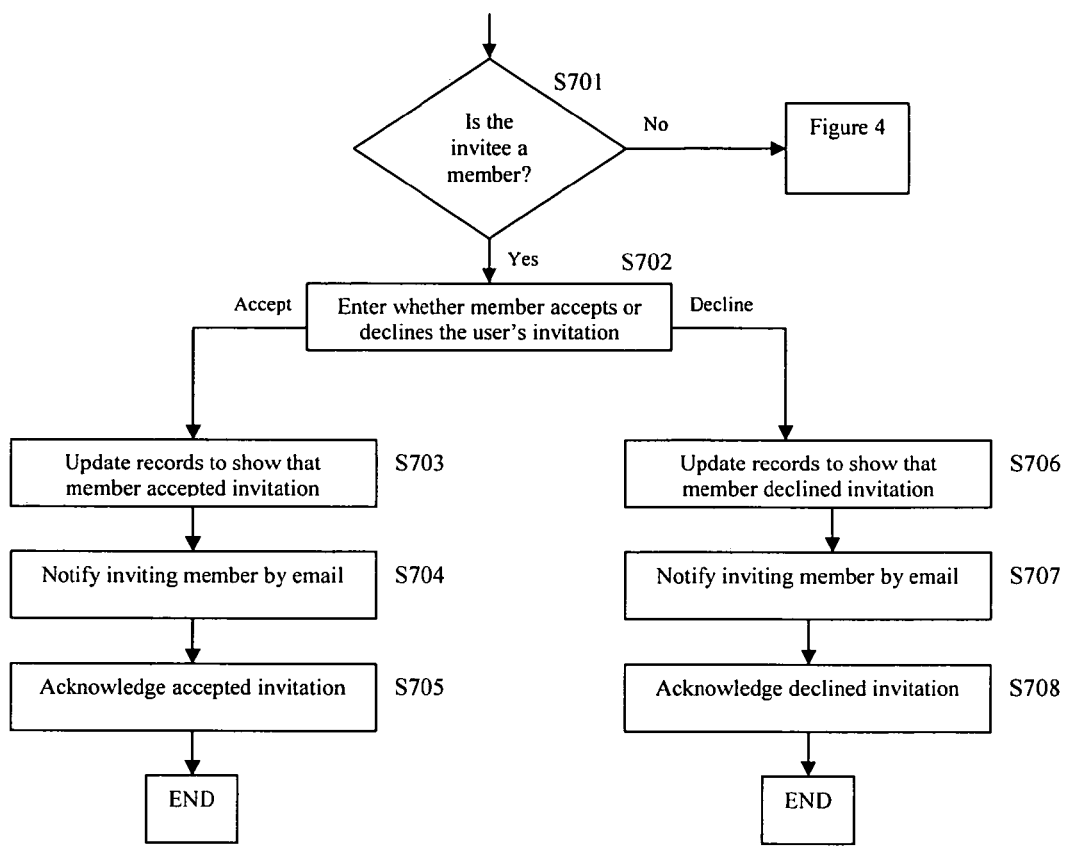
FIG. 7 shows a flow chart illustrating the step of allowing the one or more members to accept or decline the user's invitation to join the user's group, according to one embodiment of the present disclosure.

The invited members or non-members can accept the invitation into the user's group, reject the invitation, or not respond to the invitation. The members or non-members may have a predetermined time in which to accept the invitation to join the user's group. For example, a member or non-member may have up to six months or more to respond. In addition, a member or non-member who fails to respond or rejects the invitation, may change his/her mind any time within the first year, for example. After a certain period of time, for example, one year, that invitation may automatically be removed from the system. In order for a non-member to either accept or reject the invitation, he/she must become a member by creating a member account (See FIG. 4). FIG. 7 is a flow chart illustrating the step of allowing the one or more members to accept or decline the user's invitation to join the user's group, according to an embodiment of the present disclosure. The system determines whether the invitee is a member (Step S701). If it is determined that the invitee is not a member (No, Step S701), then the system jumps allows the invitee to become a member according to the process set forth in FIG. 4. If it is determined that the invitee is a member (Yes, Step S701), the member enters whether he accepts or declines the user's invitation (Step S702). If the member accepts the user's invitation (Accept, Step S702), the system will update the records to show that the member accepted the user's invitation (Step S703), notify the user (inviting member) by email (Step S704), and acknowledge the accepted invitation (Step S705). If the member declines to accept the user's invitation (Decline, Step S702), the system will update the records to show that the member declined the user's invitation (Step S706), notify the user (inviting member) by email (Step S707), and acknowledge the declined invitation (Step S708).

According to an embodiment, the system may store invitation data which comprises a member name, status of the member's invitation, date and time invitation was sent, the total number of invitations sent, the total number of invitations accepted, not responded to or rejected and if applicable, date and time the invitation was accepted or rejected.

Figure 8:
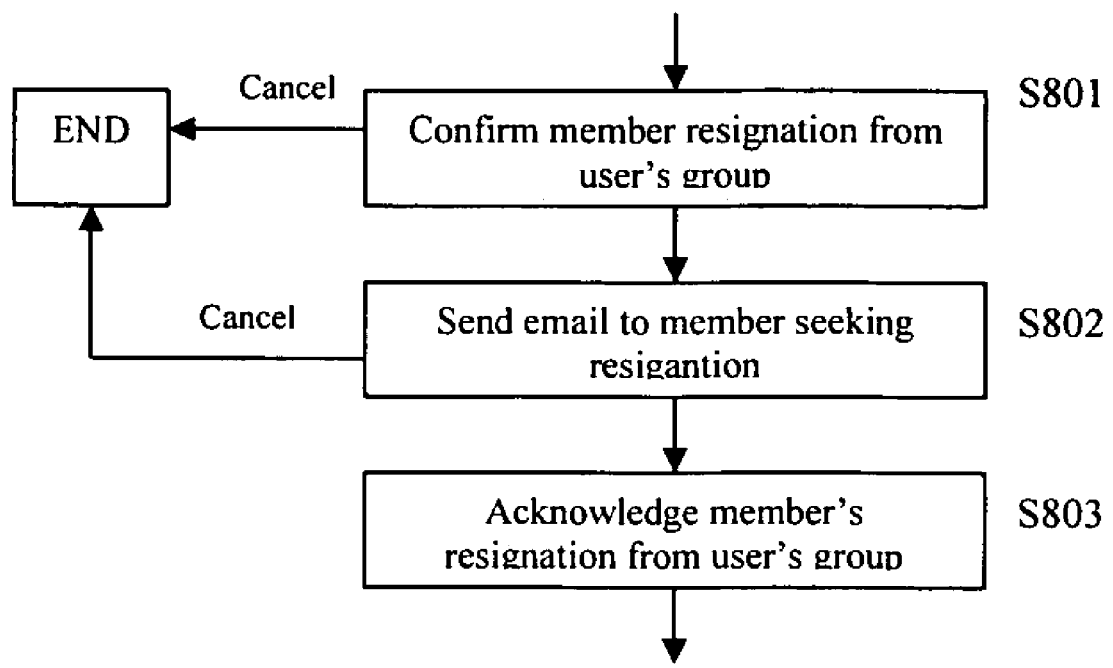
FIG. 8 shows a flow chart illustrating the process of resignation from a user's group after accepting an invitation, according to one embodiment of the present disclosure.

The one or more members can opt-out of the user's group after accepting the invitation. FIG. 8 is a flow chart illustrating the process of resignation from a user's group after accepting an invitation, according to an embodiment of the present disclosure. Member resignation from the user's group is confirmed (Step S801) and an email is sent to the member seeking resignation (Step S802). If the member decides not to cancel his/her resignation (Cancel, Steps S801 & S802), the process ends and the resignation is not completed. However, if the member goes forward with the resignation, the member's resignation from the user's group is acknowledged (Step S803).

Figure 9:
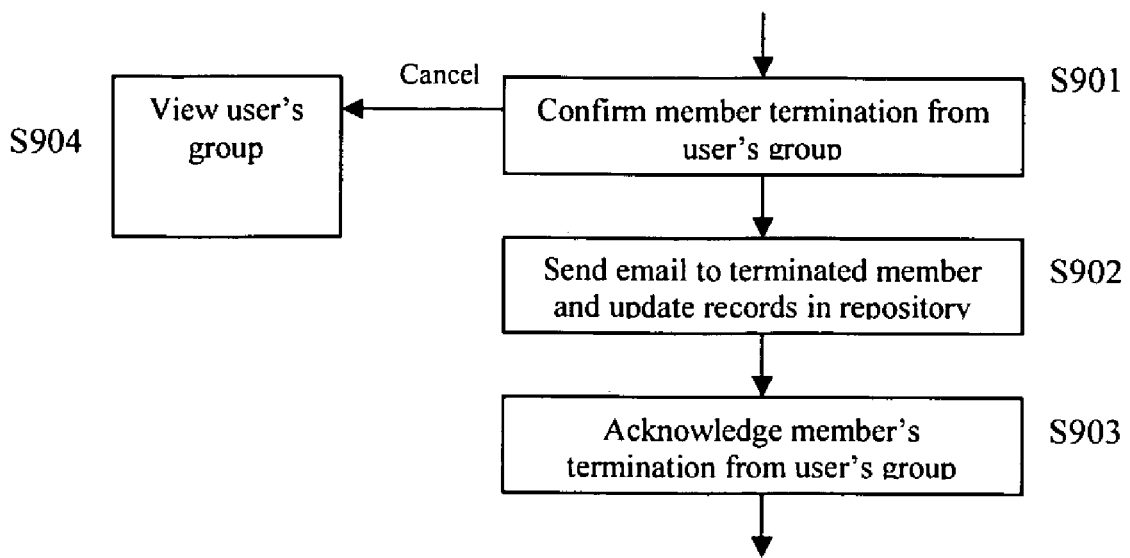
FIG. 9 shows a flow chart illustrating the process of termination from a user's group after accepting an invitation, according to one embodiment of the present disclosure.

The user can terminate the one or more members from his/her user group after these member(s) have accepted the user's prior invitation to join his/her group. FIG. 9 is a flow chart illustrating the process of termination from a user's group after accepting an invitation, according to an embodiment of the present disclosure. Member termination from the user's group is confirmed (Step S901). During this process, If the member decides to cancel his/her termination of the other member (Cancel, Step S901), termination is not completed and the user's group is viewed (Step S904). However, if the user goes forward with the termination, an email is sent to the terminated member, records are updated in the repository (Step S902) and the member's termination from the user's group is acknowledged (Step S903). According to an embodiment of the present disclosure, if the user changes his/her mind after the termination, they can re-invite the member into his/her group by sending them an invitation.

Figure 10:
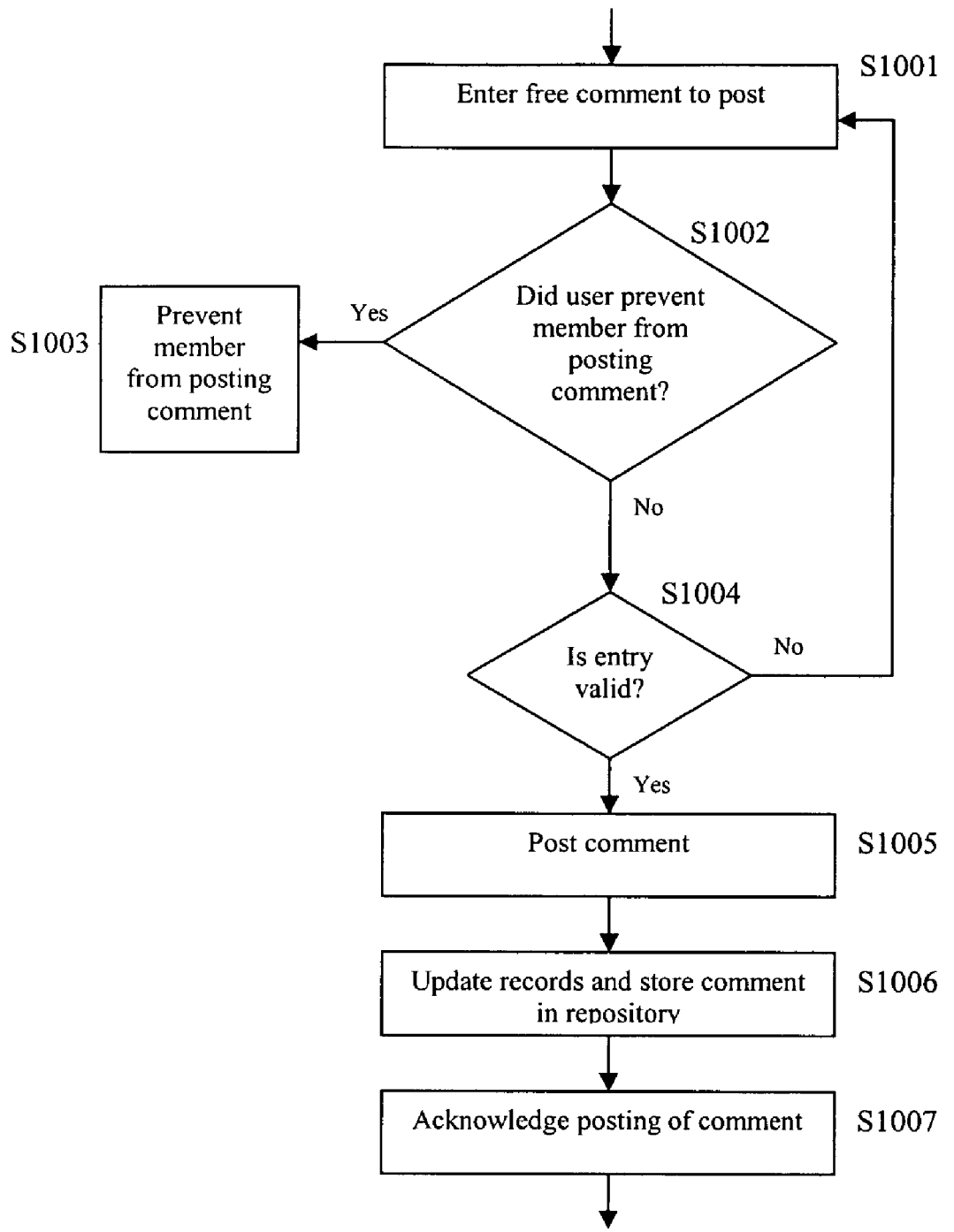
FIG. 10 shows a flow chart illustrating the posting of a free comment by a member about a user, according to one embodiment of the present disclosure.

According to an embodiment of the present disclosure, members may post one or more comments about other members. These comments can be either free comments or paid comments. FIG. 10 is a flow chart illustrating the posting of a free comment by a member about a user, according to an embodiment of the present disclosure. A member enters a comment to post (Step S1001). The system then checks to see if the user has blocked the member from posting (Step S1002). For example, the system may check to see the user's account information to make sure that the user did not block the member from posting a comment. If the member is blocked from posting (Yes, Step S1002), the system prevents the member from posting a comment (Step S1003). If the member is not blocked from posting, (No, Step S1002) the system then checks the entry for validity (Step S1004).

For example, the system may check whether the comment contains any vulgar language. If the entry is not valid (No, Step S1004), the system loops back to Step S1001. If the entry is valid (Yes, Step S1004), the comment is posted (Step S1005) and the records are updated by storing the comment in the repository (Step S1006). The system then acknowledges posting of the comment (Step S1007). According to an embodiment of the present disclosure, the free comments may be signed by the member to allow others to determine the comment's accuracy and trustworthiness. For example, the free comments may be automatically signed with the member's full name.

Figure 11:
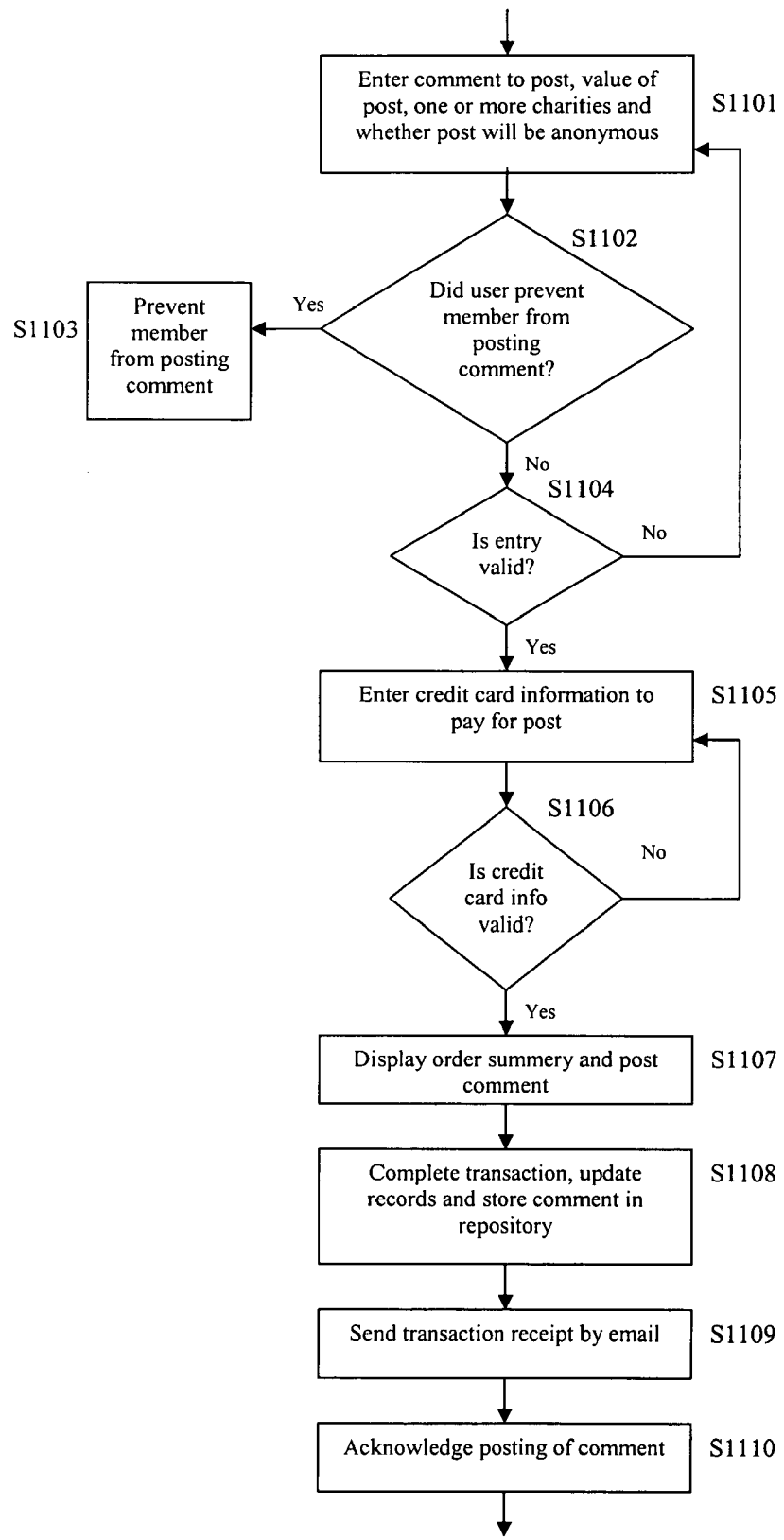
FIG. 11 shows a flow chart illustrating the posting of a paid comment by a member about a user, according to one embodiment of the present disclosure.

FIG. 11 is a flow chart illustrating the posting of a paid comment by a member about a user, according to an embodiment of the present disclosure. A member enters a comment to post, the value of the post, one or more charities and whether or not the post will be anonymous (Step S1101). According to an embodiment, the value of the post may be suggested and the member may select the one or more charities from a predetermined list of charities. The proceeds or a portion of the proceeds from the paid comment can be donated to one or more selected or default charities. For example, members can select from a list of charities and the system will collect the payments and automatically transfer the funds to the relevant charities on a periodic basis. The system may also provide members with information relevant for declaring the tax deduction. According to an embodiment of the present disclosure, the paid comment may be in a predetermined amount or an amount determined by the one or more members. For example, the minimum cost for a paid comment may be $2, while the maximum cost may be any amount determined by a member. The system then checks to see if the user has blocked the member from posting (Step S1102). For example, the system may check to see the user's account information to make sure that the user did not block the member from posting a comment. If the member is blocked from posting (Yes, Step S1102), the system prevents the member from posting a comment (Step S1103). If the member is not blocked from posting, (No, Step S1102) the system then checks the entry for validity (Step S1104). If the entry is not valid (No, Step S1104), the system loops back to Step S1101. If the entry is valid (Yes, Step S1104), the member enters his/her credit card information to pay for the post (Step S1105). The system then checks to see if the credit card information is valid (Step S1106). If the credit card information is not valid (No, Step S1106), the system loops back to Step S1105. However, if the credit card information is valid (Yes, Step S1106), the order summary is displayed and the comment is posted (Step S1107). The transaction is then completed, and the records are updated by storing the comment in the repository (Step S1108). A transaction receipt is sent by email (Step S1109) and the posting of a comment is acknowledged (Step S1110). According to an embodiment of the present disclosure, the one or more members can pre-pay for comments by choosing an amount to deduct from their credit card. This amount is then transferred into the member's account as a credit balance. When the member posts a paid comment, the amount paid can be deducted from the member's credit balance.

According to an embodiment of the present disclosure, one or more user weight values may be calculated. The one or more user weight values are used to rank users and comments by their validity. For example, this can be done by compiling consistency and dependency information over the total number of users and the total number of comments. The one or more user weight values may be a recursive function of one or more of the following, which may be displayed for each user, any time a user is referenced and/or may be combined into a single scalar value: a number of members in the user's group and their user weight, a total value of posted paid comments about the user and/or volume of posted comments about the user, and/or the accuracy of the total number of posted comments about the user. For example, if the user has a high number of paid comments with a high value, then his user weight value will be higher. For example, a user with 75 comments (both paid and free), with a total value of $500 in paid comments will have a higher user value than a user with 75 comments (both paid and free), with a total value of $50 in paid comments. Moreover, if the members in a user's group have a high user weight value, then the user is going to have a higher user weight value. However, if the members in the user's group have a lower user weight value, then the user's user weight value will be lower. According to an embodiment, the one or more user weight values are associated with and displayed for each user when the user is referenced and are calculated for every new posted comment by one or more members. For example, the paid comments may be ranked by an amount paid and displayed in descending order of the amount paid, with a highest amount first. The free comments may be ranked by the user weight value of the member and displayed after the paid comments, with a higher user weight value first.

Figure 12:
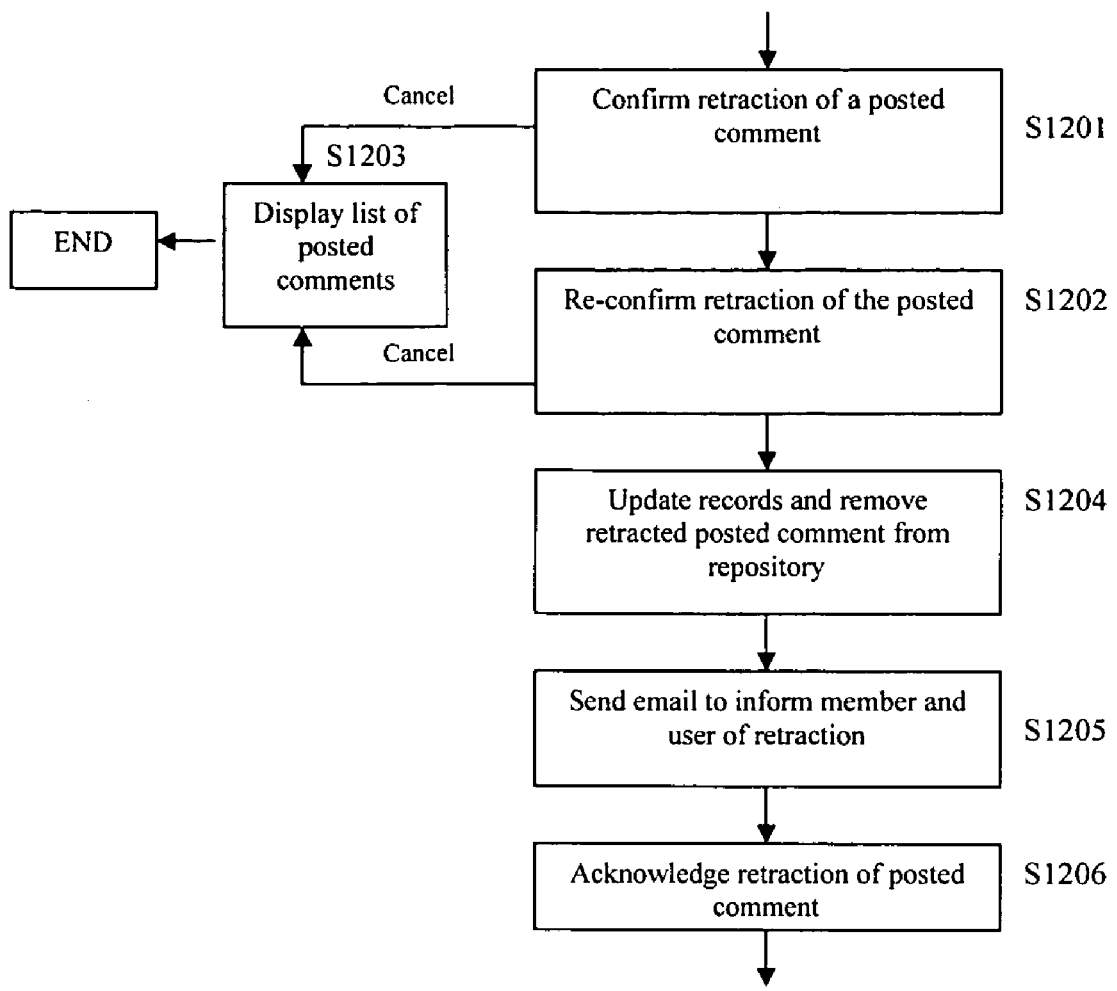
FIG. 12 shows a flow chart illustrating the process of retracting a posted comment, according to one embodiment of the present disclosure.

A member can retract a free or paid comment after it is posted. FIG. 12 is a flow chart illustrating the process of retracting a posted comment, according to an embodiment of the present disclosure. A member confirms the retraction of a posted comment (Step S1201) and reconfirms the retraction of the posted comment (Step 1202). If the member decides to cancel the retraction (Cancel, Steps S1201-1202), the list of posted comments will be displayed and the process will end (Step S1203). However, if the member decides to continue with the retraction, the records will be updated and the retracted posted comment will be removed from the repository (Step S1204). An email is sent to the member and the user to inform them of the retraction (Step S1205) and the retraction of the posted comment is acknowledged (Step S1206).

Figure 13:
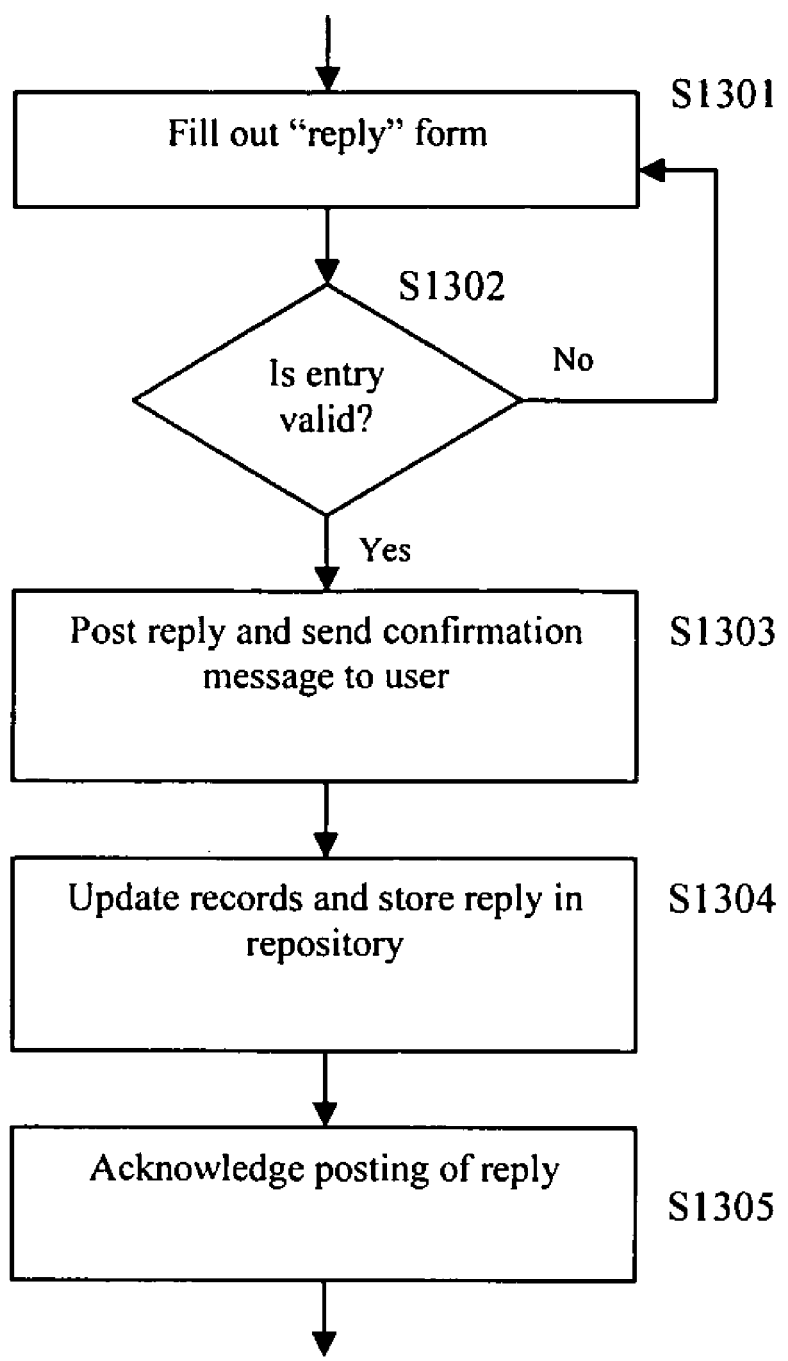
FIG. 13 shows a flow chart illustrating the process of posting a reply to a posted comment by one or more members, according to one embodiment of the present disclosure.

A user may post a reply to any posted comment by the one or more members. This allows a user to provide a clarity, explanation, rebuttal, or emphasis to any posted comment. FIG. 13 is a flow chart illustrating the process of posting a reply to a posted comment by one or more members, according to an embodiment of the present disclosure. A user fills out a "reply" form (Step S1301) and the system checks the validity of the entry (Step S1302). If the entry is not valid (No, Step S1302), then the system loops back to Step S1301. However, if the entry is valid (Yes, Step S1302), then the reply is posted and a confirmation message is sent to the user (Step S1303). The records are updated, the reply is stored in the repository (Step S1304) and the posting of the reply is acknowledged (Step S1305).

Figure 14:
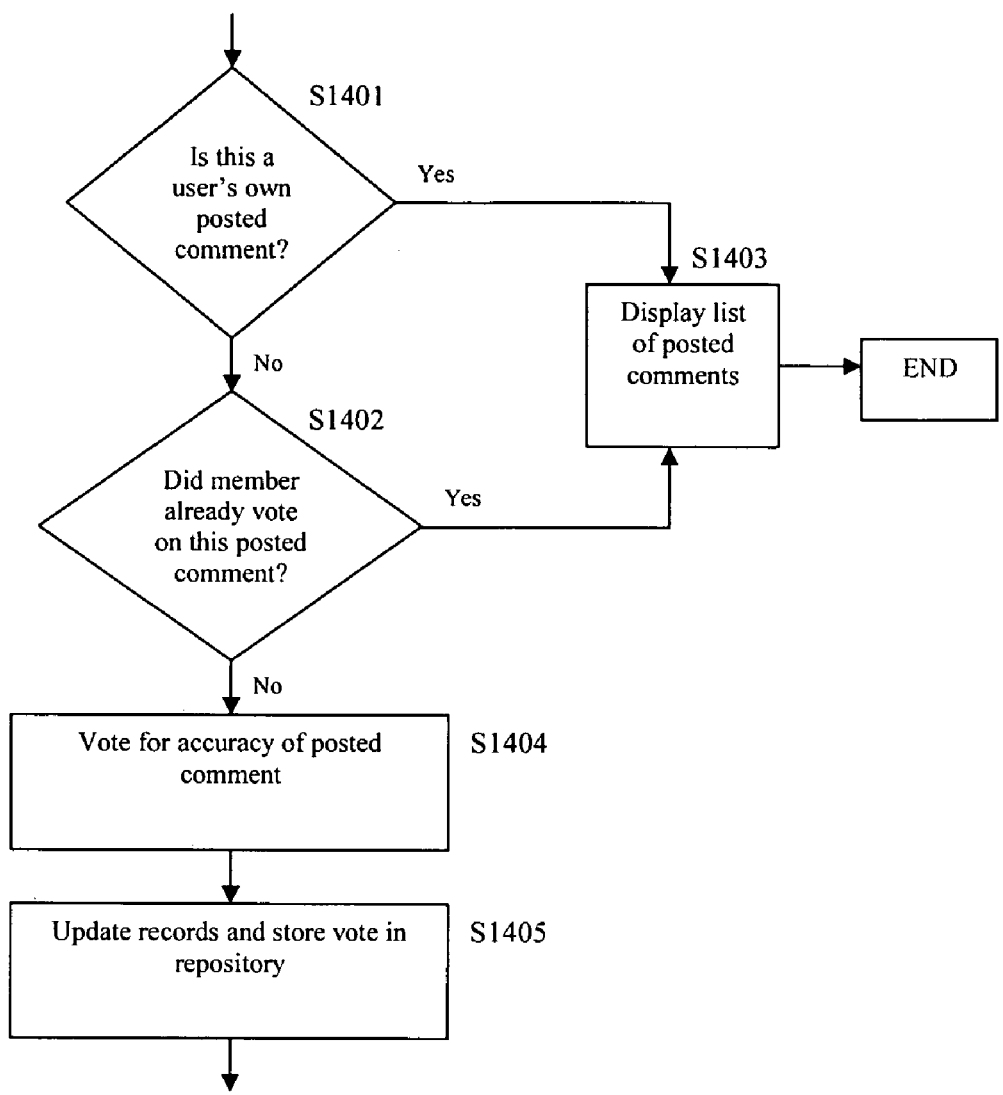
FIG. 14 shows a flow chart illustrating the process of voting for the accuracy of a post, according to one embodiment of the present disclosure.

The members can each vote on the accuracy of a posted comment. For example, the vote may be initiated by a user or member with an email invitation. According to an embodiment, the votes for a user's posted comments may be used in determining the user weight value for that user. FIG. 14 is a flow chart illustrating the process of voting for the accuracy of a post, according to an embodiment of the present disclosure. The system checks to see if this is a user's own posted comment (Step S1401). If it is (Yes, Step S1401), then the system displays the list of posted comments (Step S1402) and ends. If it is not a user's own posted comment (No, Step S1401), the system checks to see if the member already voted on the posted comment (Step S1403). If the member already voted on the posted comment (Yes, Step S1403), then the system displays the list of posted comments (Step S1402) and ends. However, if the member had not already voted on the posted comment (No, Step S1403), the member can vote on the accuracy of the posted comment (Step S1404). The records are then updated and the vote is stored in the repository (Step S1405). For example, the vote may be a "yes" or "no" answer as to whether the posted comment is accurate, or it may be a number from a scale of 1 to 10, ranging from never true to always true.

Figure 15:
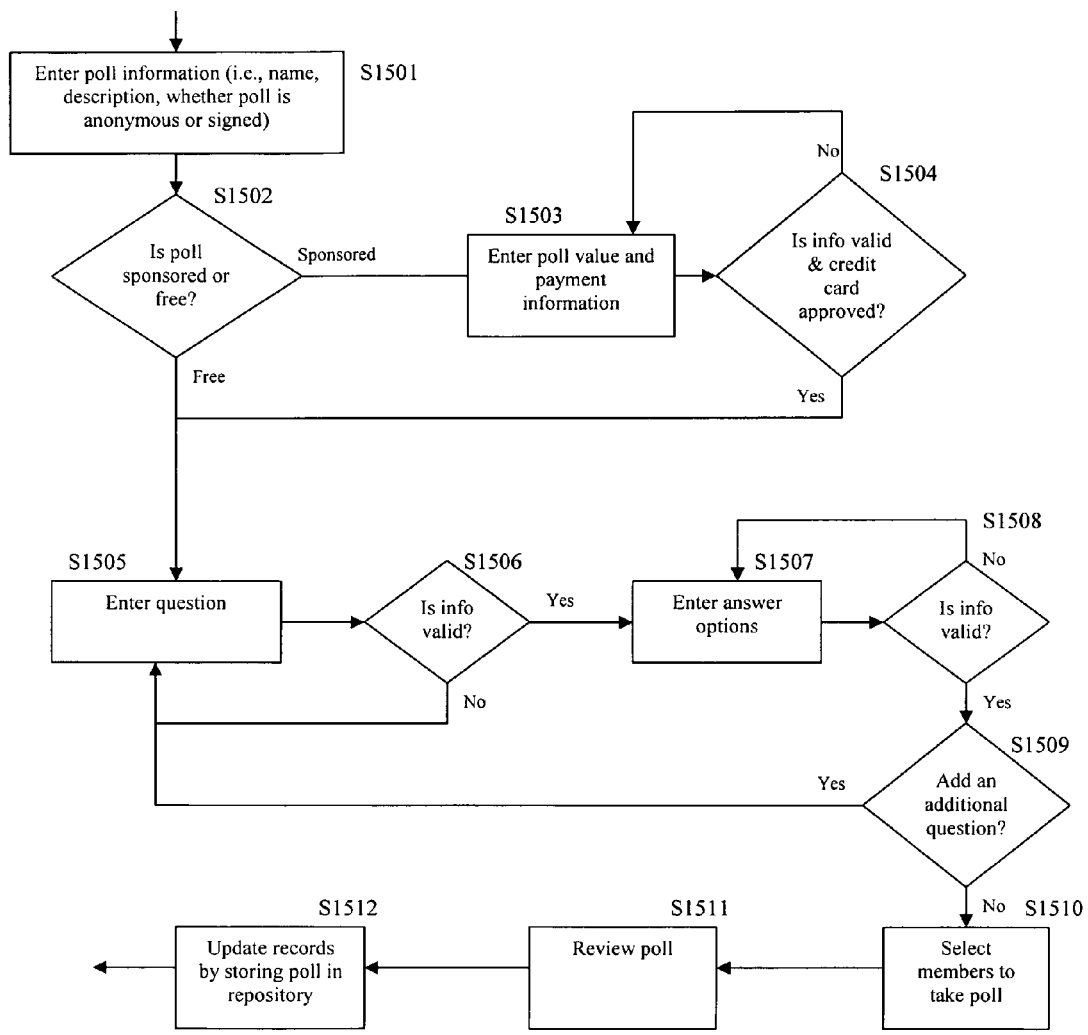
FIG. 15 shows a flow chart illustrating the process of creating a poll, according to one embodiment of the present disclosure.

Users may create a poll about themselves for either public or private viewing by choosing from default questions or creating their own customized questions. A poll can be about any topic that the a user chooses, for example, how well the members know the user, members' opinions on certain topics, etc. The polls can be sent to the members of a user's group or they can be open to the public. According to an embodiment of the present disclosure, the user can choose to have the poll anonymous or signed and sponsored or free. A sponsored poll is a poll where the user agrees to provide the member with credits when a poll is successfully completed by the member. For example, a user can send an invitation to one or more members to take a poll offering to deposit $10 into the member's account upon successful completion of the poll. The credits earned by successfully completing a poll can be used, for example, to create paid posts about another member, and/or to pay for a new poll. FIG. 15 is a flow chart illustrating the process of creating a poll, according to an embodiment of the present disclosure. The user enters the poll information, such as the name, description and whether the poll will be anonymous or signed (Step S1501). The system checks to see if the poll is sponsored or free (Step S1502). If the poll is sponsored (Sponsored, Step S1502), the user can enter the poll value and payment information (Step S1503). The system checks to see if the information is valid and the credit card approved (Step S1504). If the information is not valid or the credit card is not approved (No, Step S1504), the system loops back to Step S1503. If the information is valid and the credit card is approved (Yes, Step S1504) or the poll is free (Free, Step S1502), the user can enter the first question (Step S1505). If the question is not valid (No, Step S1506), the system will loop back to Step S1505. Otherwise (Yes, Step S1506), the user enters the answer options (Step S1507). If the information is not valid (No, Step S1508), the system loops back to Step S1507. If the information is valid (Yes, Step S1508), the user can add an additional question (Step S1509). If the user decides to add additional questions (Yes, Step S1509), the system loops back to Step S1505, until the user no longer has additional questions. If the user does not have anymore questions to add (No, Step S1509), the user selects members to take the poll (Step S1510), reviews the poll (Step S1511) and the poll is stored in the repository (Step S1512).

Figure 16:
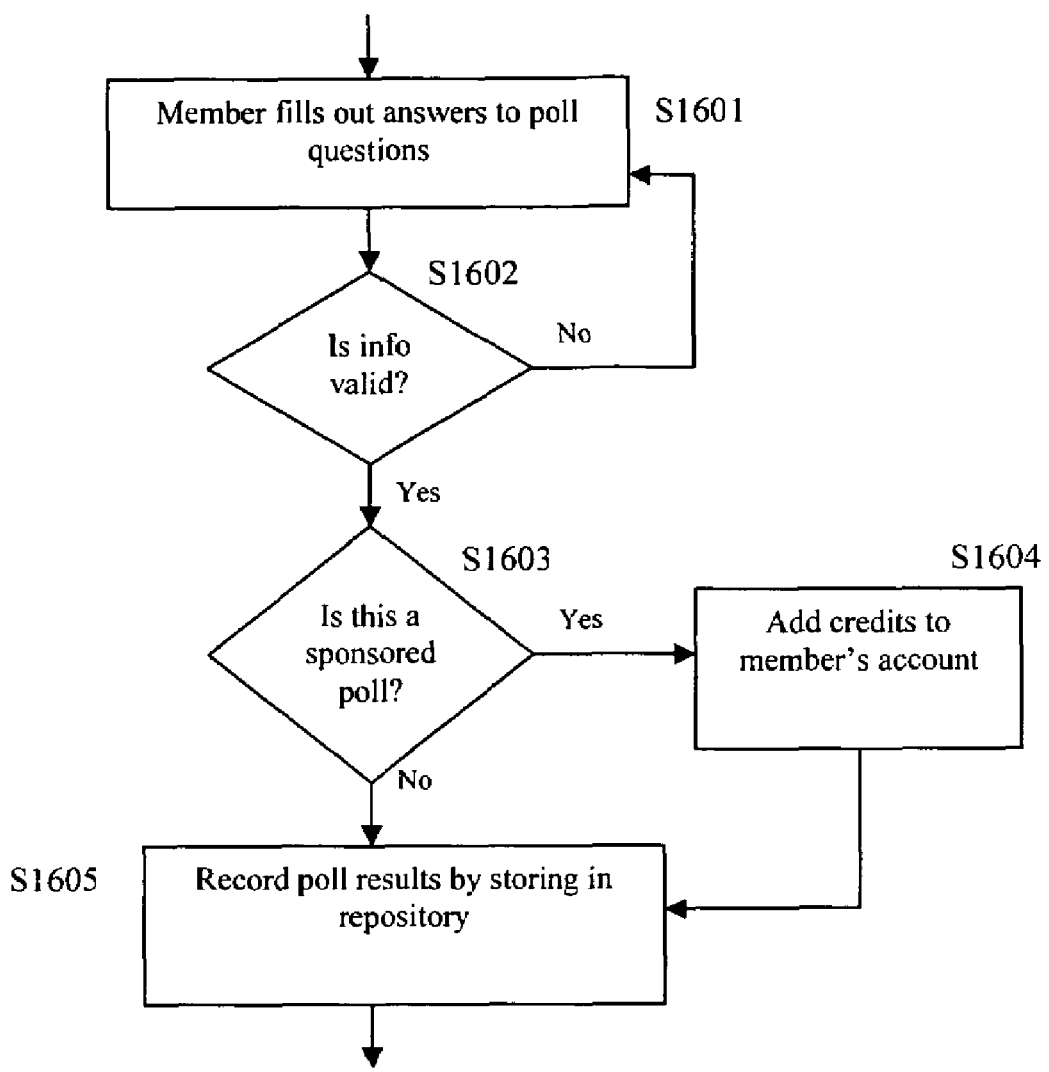
FIG. 16 shows a flow chart illustrating the process of responding to a user poll, according to one embodiment of the present disclosure.

FIG. 16 is a flow chart illustrating the process of responding to a user poll, according to an embodiment of the present disclosure. A member fills out the answers to the poll questions (Step S1601) and the system checks to see if the information is valid (Step S1602). If the information is not valid (No, Step S1602), the system loops back to Step S1601. If the information is valid (Yes, Step S1602), the system checks to see if the poll is sponsored (Step S1603). If the poll is sponsored (Yes, Step S1603), the credits are added to the member's account (Step S1604), and the poll results are recorded by storing them in the repository (Step S1605). If the poll is not sponsored (No, Step S1603), the poll results are recorded by storing them in the repository (Step S1605).

Figure 17:
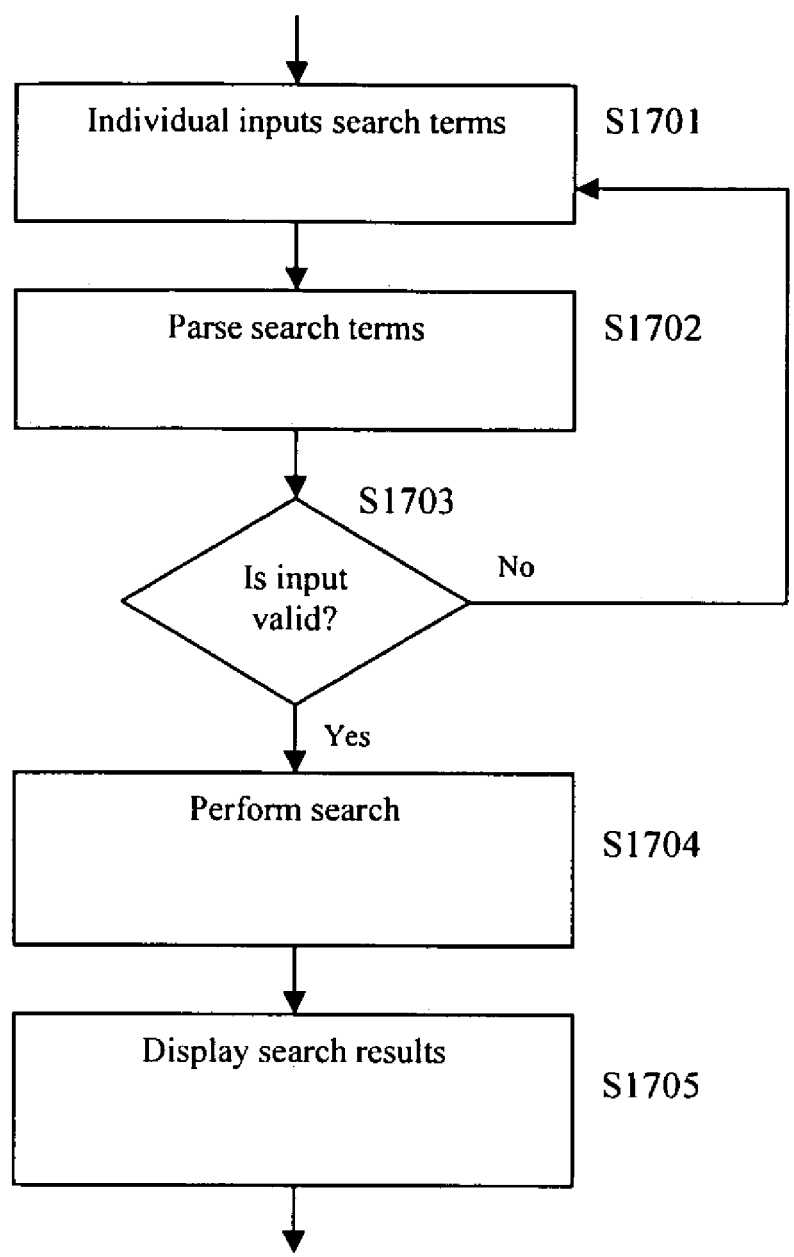
FIG. 17 shows a flow chart illustrating the process of searching for a member, according to one embodiment of the present disclosure.

Any member of the general public can search for a member of the system by using a basic search (for example, first name and/or last name) or an advanced search (for example, name, location and/or other facts). The search results will be displayed according to their order of relevance. FIG. 17 is a flow chart illustrating the process of searching for a member, according to an embodiment of the present disclosure. An individual can input search terms (Step S1701) and the system will parse the search terms (Step S1702) and determine whether the input was valid (Step S1703). For example, the individual can use any term included in the user identity data as a search term, such as a user's name (first and/or last name), a user's location, or a user's email address. If a user does not want his/her user identity information to be publicly accessible, the user may restrict his/her user identity information to members that are only a part of his/her user group, according to an embodiment of the present disclosure. If the input is not valid (No, Step S1703), the system loops back to Step S1701. However, if the input is valid (Yes, Step S1703), the search is performed (Step S1704) and the search results are displayed (Step S1705).

Figure 18:
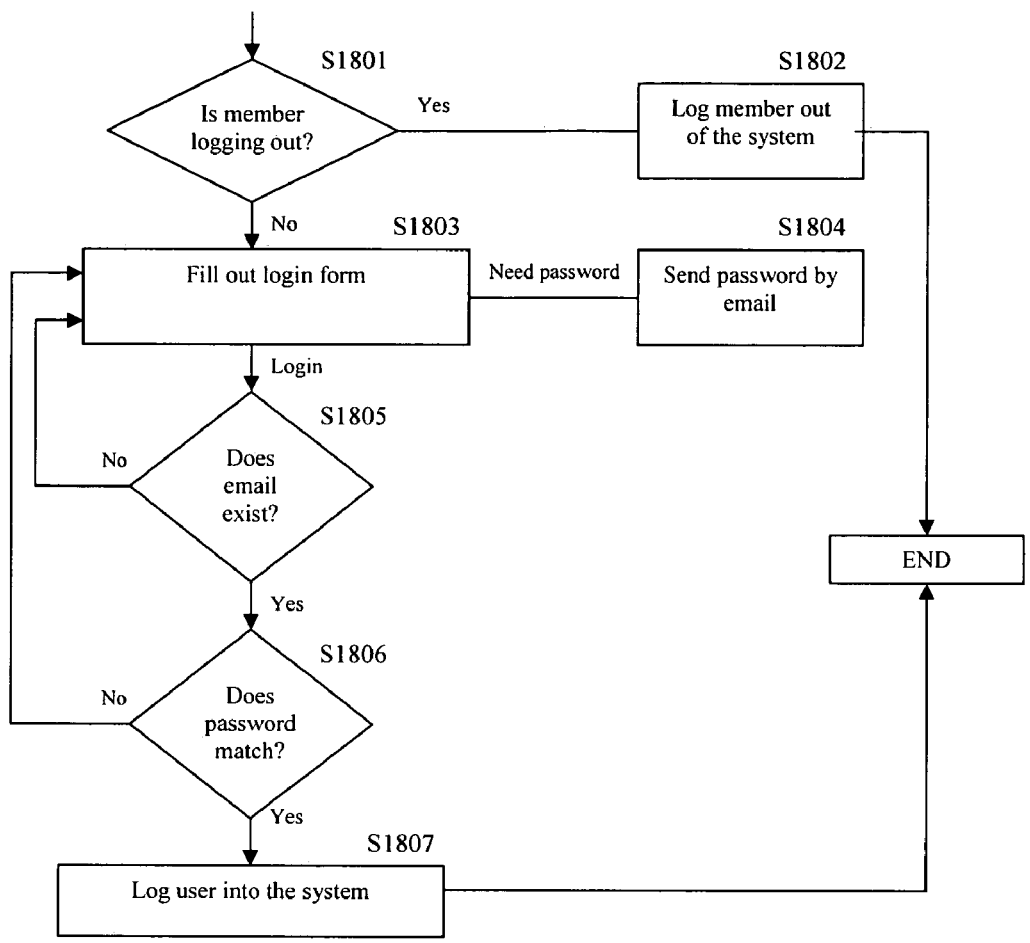
FIG. 18 shows a flow chart illustrating the process of logging in or logging out of the system, according to one embodiment of the present disclosure.

A member can login or logout of their account at any time. FIG. 18 is a flow chart illustrating the process of logging in or logging out of the system, according to an embodiment of the present disclosure. If a member is logging out (Yes, Step S1801), the system will log the member out (Step S1802) and end. However, if the member is not logging out (No, Step S1801), the member fills out the login form (Step S1803). If the member forgets a password (Need Password, Step S1803), the system will send the member the password, for example, by email (Step S1804). If the member is logging in (Login, Step S1803), the system checks to see if the email exists (Step S1805). If the email does not exist (No, Step S1805), the system loops back to Step S1803. If the email exists (Yes, Step S1805), the system checks to see if the password entered matches the password stored (Step S1806). If the password does not match (No, Step S1806), the system loops back to Step S1803. If the password matches (Yes, Step S1806), the system logs the user into the system (Step S1807) and ends.

Figure 19:
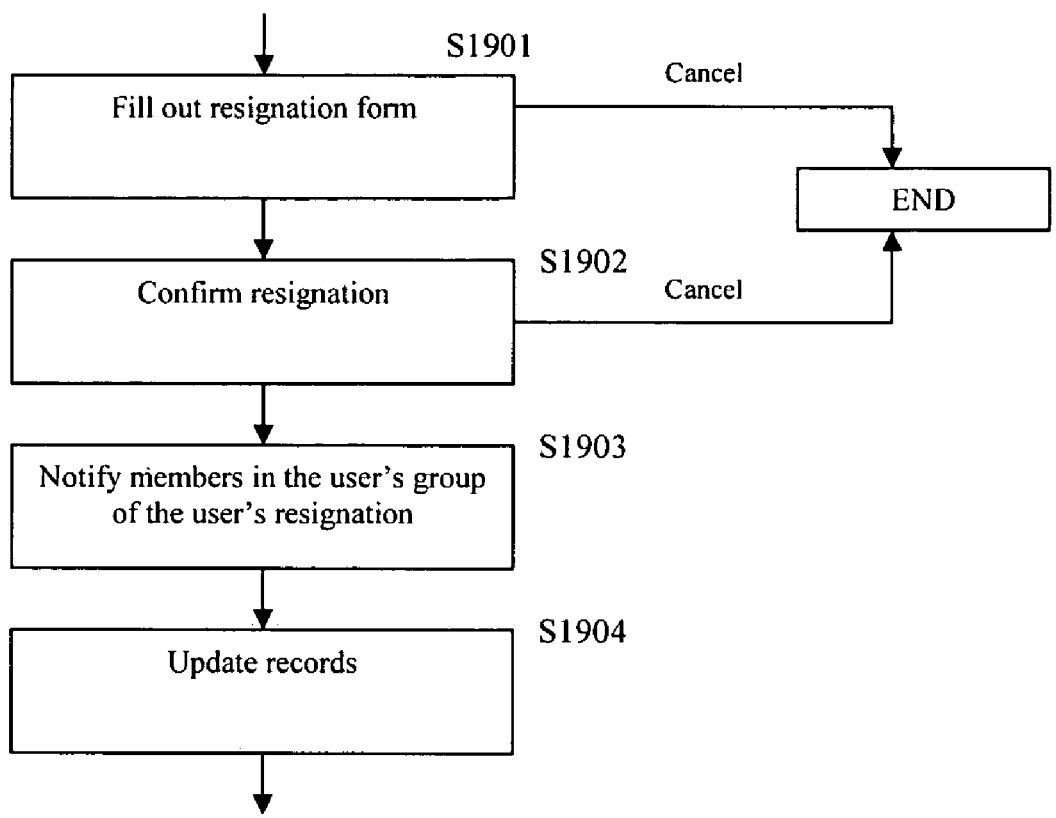
FIG. 19 shows a flow chart illustrating the process of deleting an account, according to one embodiment of the present disclosure.

A member can delete his/her account at any time. This will permanently delete all comments and other related data from the repository. Alternatively, the comments and related data may be maintained in the repository for a predetermined amount of time in the event the member decides to resume his/her account. FIG. 19 is a flow chart illustrating the process of deleting an account, according to an embodiment of the present disclosure. The member fills out a resignation form (Step S1901) and confirms resignation (Step S1902). If the user decides to cancel the termination of his/her account (Steps S1901, S1902), then the system will end. Otherwise, the system will notify the members of the user's group of the user's resignation (Step S1903) and update records (Step S1904).

Figure 20:
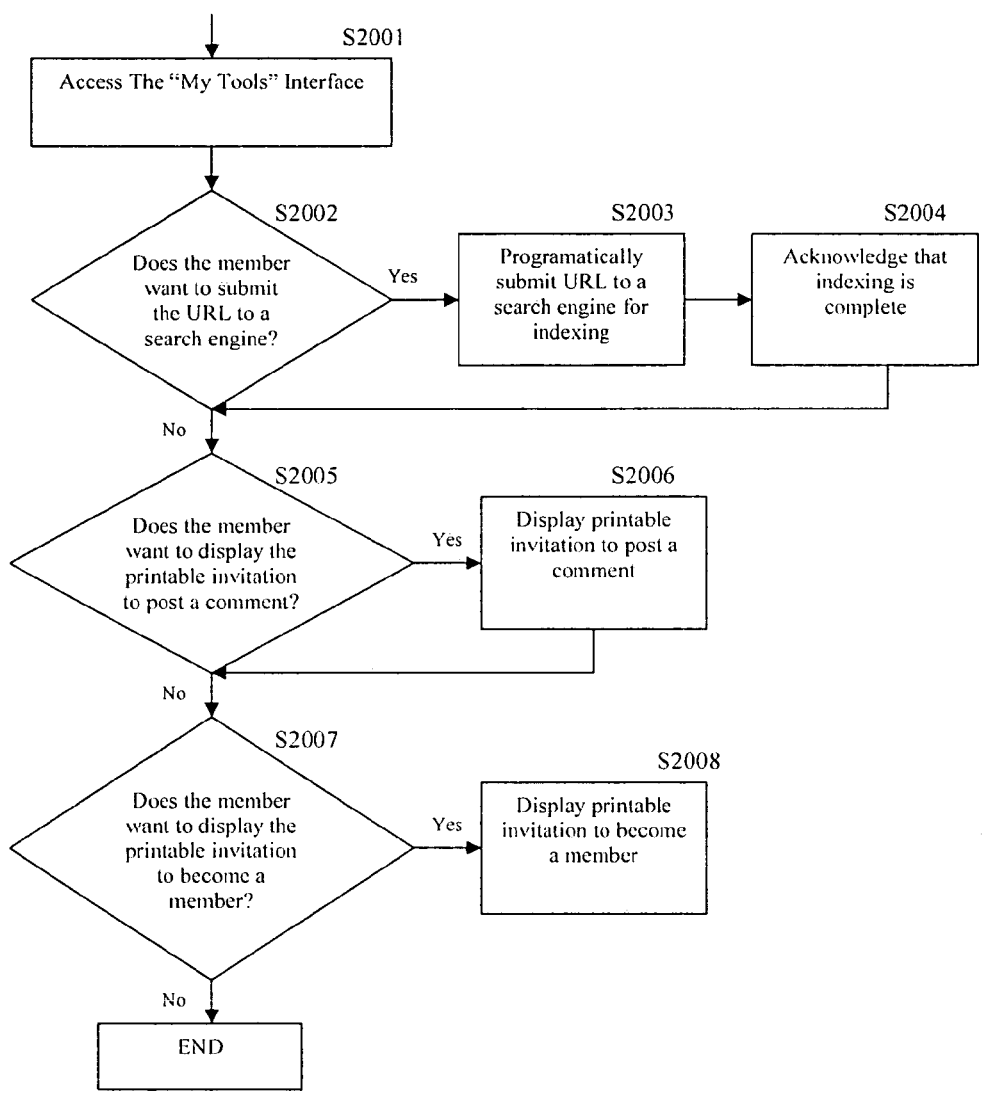
FIG. 20 shows a flow chart illustrating a feature of a system for collecting and storing information about individuals in a social network, according to one embodiment of the present disclosure.

A member can access a "My Tools" interface as part of his/her member account, according to an embodiment of the present disclosure. This interface allows a user to do any of the following: submit a Uniform Resource Locator ("URL") to a search engine, for example, www.google.com, for indexing, display an invitation to post, or display an invitation to join. FIG. 20 is a flow chart illustrating a feature of a system for collecting and storing information about individuals in a social network, according to an embodiment of the present disclosure. Once a user access the "My Tools" interface (Step S2001), the system checks to see if the user wants to submit his/her URL to a search engine to index (Step S2002). For example, a member can have comments posted about him/her available through an Internet search engine, such as www.google.com. If the user decides to submit his/her URL to a search engine (Yes, Step S2002), the system will programmatically submit the URL to a search engine for indexing (Step S2003) and acknowledge that the indexing is complete (Step S2004). After the acknowledgment, or if the user does not want to submit his/her URL to a search engine (No, Step S2002), the system then checks to see if the user wants to display a printable invitation to post a comment (Step S2005). If the user decides to display a printable invitation to post a comment (Yes, Step S2006), the system will display the printable invitation to post a comment (Step S2007). Otherwise (No, Step S2007), the system will check to see if the user wants to display a printable invitation to others to become a member (Step S2008). If the user decides to display a printable invitation to become a member (Yes, Step S2008), the system will display the invitation (Step S2009). If the user decides not to display a printable invitation to others to become a member (No, Step S2008), the system will end.

According to an embodiment of the present disclosure, institutions, including colleges, universities, high schools, and related organizations may post facts such as matriculation years, credentials, graduation year, activities, major, etc. about a user. This institutional commentary may be posted without charge.

Numerous additional modifications and variations of the present disclosure are possible in view of the above-teachings. It is therefore to be understood that within the scope of the appended claims, the present disclosure may be practiced other than as specifically described herein.

What is claimed is:

1. A method of encouraging charitable donations by users of a social network, where users may benefit from donations of money to one or more charities by association with social causes represented by the one or more charities and by public recognition of their donations, comprising:

providing an online social network for users to obtain information about other users, wherein the online social network is accessible to users who use a first computer which is connected to an Internet;

allowing a user to become a member of the online social network by creating a user account and assigning a part of a memory of a second computer to that user account;

collecting user identity data inputted using the first computer by the user, wherein the user identity data comprises the user's name, email address, nickname, date of birth, home address, work address, high school, college, degree, place of employment, work history, maiden name, country of residence, country of birth, or any other identification information;

associating the user identity data with the user account by storing the user identity data in the part of the memory assigned to the user account;

allowing the user to create a user profile containing information about the user by inputting such information using the first computer;

associating the user profile with the user account by storing the user profile information in the part of the memory assigned to the user account;

allowing one or more different users of the online social network to view the user profile;

allowing the user to send an invitation to the one or more different users to donate money to the one or more charities to post a descriptive comment about the user on the online social network, wherein the one or more different users post a descriptive comment about the user if and only if the one or more different users, in order to post the descriptive comment, donate money to the one or more charities;

allowing the one or more different users to post at least one descriptive comment comprising a word or group of words describing a character or trait of the user on the social network if the one of more different users donate money to one or more charities in order to post the at least one descriptive comment about the user, wherein the user does not benefit financially from the money donated to the one or more charities;

storing the posted comment in a part of the memory assigned to the posted comment;

associating the amount of money donated to the one or more charities with the posted comment by storing the amount of money donated in a part of the memory assigned to the posted comment;

calculating a user weight value for the user based on one or more of the amount of money donated to the one or more charities by the one or more different users and the number of descriptive comments posted by the one or more different users, wherein the user weight value is a numerical value indicative of the reliability of the reputation of the user;

calculating a different user weight value for each of the one or more different users based on the amount of money donated to one or more charities by the each of the respective one or more different users, wherein the different user weight value is a numerical value indicative of the reliability of the reputation of each of the one or more different users;

recalculating the user weight value and the different user weight value for each of the one or more different users after a new descriptive comment is posted by the one or more different users;

allowing the users of the social network to view the descriptive comment posted by the one or more different users and the user weight values and the different user weight values;

allowing the user to create a poll for those using the online social network to vote on accuracy of a descriptive comment about the user posted by the one or more different users, wherein the user contributes a sum of money to be used by those voting on the accuracy of the descriptive comment about the user, the sum of money being directly proportional to the number of votes received on the accuracy of the descriptive comment about the user, and the sum being used when those voting on the accuracy of the descriptive comment about the user post different descriptive comments or contribute money to be used by those voting in other polls;

allowing users of the social network to view the amount of money donated to the one or more charities associated with the descriptive comment posted by the one or more different users; and enabling the users of the social network to evaluate the reputation of the user based upon numerical values of the user weight value of the user and content of the descriptive comments.

2. The method of claim 1, further comprising storing the invitation data and user member data in a part of the memory assigned to the user account, wherein the invitation data comprises a member name, status of the invitation, date and time invitation was sent, a total number of invitations sent, a total number of invitations accepted, not responded to or rejected and if applicable, date and time the invitation was accepted or rejected, and the user member data comprises the number of comments posted about the user, and date and time the user became a member.

3. The method of claim 1, further comprising recalculating the user weight value for the user based on the number of invitations accepted by the one or more different users and the amount of money donated to the one or more charities by the one or more different users.

4. The method of claim 1, wherein the invitation sent by the user states a sum chosen by the user, and wherein the one or more different users may post a descriptive comment about the user if and only if the one or more different users, in order to post the descriptive comment, donate money to the one or more charities equal to or greater than the sum chosen by the user.

5. The method of claim 1, wherein the user weight value and the different user weight value are calculated based, in part, on the accuracy of the posted descriptive comments.

6. The method of claim 1, wherein the user weight value and the different user weight values increase with an increase in the amount of money donated to the one or more charities.

7. The method of claim 1, further comprising allowing the one or more different users to search the posted comments by identifying one or more terms of the user identity data.

8. The method of claim 1, further comprising allowing the user to create a poll for the one or more different users of the online social network to vote on an issue to the user, and further comprising allowing the one or more different users to vote in the poll if the one of more different users donate money to one or more charities in order to vote in the poll, and further comprising preventing the one or more different users from voting in the poll if the one or more different users have not donated money to one or more charities in order to vote in the poll, wherein the user does not benefit financially from the money donated to the one or more charities.

9. The method of claim 1, further comprising allowing the user to create a blog for the one or more different users of the online social network to post comments relating to the blog if the one of more different users donate money to one or more charities in order to post comments relating to the blog, further comprising preventing the one or more different users from posting comments relating to the blog if the one or more different users have not donated money to one or more charities in order to post comments relating to the blog, wherein the user does not benefit financially from the money donated to the one or more charities.

10. The method of claim 1, wherein the user weight value increases with an increase in the number of descriptive comments posted by the one or more different users.

11. The method of claim 1, further comprising allowing the user to engage in an activity relating to the online social network if the user donates money to one or more charities in order to engage in the activity relating to the online social network.

12. The method claim 11, wherein the activity relating to the online social network comprises posting a descriptive comment about the user or voting in a poll created by the user.

13. The method of claim 1, wherein the invitation to one or more members or non-members is sent by email.

14. A method of encouraging charitable donations by users of a social network, where users may benefit from donations of money to one or more charities by association with social causes represented by the one or more charities and by public recognition of their donations, comprising:

providing an online social network for users to obtain information about other users by logging onto the online social network;

allowing a user to become a member of the online social network by creating a user account and storing information relating to the user account in a memory of a computer;

allowing the user to enter user identity data;

verifying that the user identity data is valid;

allowing the user re-enter the user identity data if the user identity data is invalid;

associating the user identity data with the user account by storing the user identity data in the memory;

allowing the user to create a user profile containing information about the user;

associating the user profile with the user account by storing the user profile information in the memory;

allowing the user to create a poll for one or more different users of the online social network;

allowing one or more different users of the online social network to view the user profile by inputting information identifying the user account;

allowing the one or more different users to deposit money in a prepayment account;

storing the money deposited in the prepayment account in the memory;

allowing the one or more different users to post at least one descriptive comment about the user on the online social network or to vote in the poll created by the user if the one or more different users donated, in order to post the at least one descriptive comment about the user or vote in the poll created by the user, any amount of the money deposited in the prepayment account to one or more charities, wherein the user does not benefit financially from the money donated to one or more charities;

storing the posted comment or the poll vote in the memory along with the amount of money donated to the one or more charities with the posting of the comment or the poll vote;

calculating a user weight value for the user based on the amount of money donated to the one or more charities by the one or more different users, wherein the user weight value for the user indicates the willingness of the one or more different users to donate money to a charity in order to post a descriptive comment about the user or vote in a poll created by the user;

calculating a different user weight value for each of the one or more different users based on the amount of money donated to one or more charities by each of the respective one or more different users;

allowing the users of the online social network to view the descriptive comment posted by the one or more different users and the user weight values and the different user weight values;

allowing users of the social network to view the amount of money associated with the descriptive comment posted by the one or more different users; and enabling the users of the social network to evaluate the reputation of the user based upon the user weight value of the user and content of the descriptive comments posted about the user.

15. The method of claim 14, wherein the comments are ranked by an amount donated to the one or more charities and displayed in descending order of the amount donated, with a highest amount first.

16. The method of claim 14, wherein verifying user identity data comprises a zero-value transaction on a credit card owned by an individual with the same last name as the user.

17. A method of encouraging charitable donations through the collection and storage of information about individuals in a social network, comprising:

allowing a user to send an invitation over an Internet to one or more members or non-members, by inputting an address identifying the one or more members or non-members along with the invitation, wherein the invitation comprises an invitation to post a comment about the user by donating any amount of money to one or more selected or default charities;

allowing the one or more members or non-members to accept or to decline the user's invitation by responding to the invitation electronically and transmitting that response to the user, wherein the one or more non-members create a member account in order to accept or to decline the user's invitation and to become members by inputting identifying data about the one or more non-members;

allowing the one or more members to post one or more comments about the user by donating any amount of money to the one or more charities and inputting one or more comments;

assigning a value to each of the one or more posted comments by the one or more members based on the amount of money of each donation and storing each value along with the posted comments in a memory;

using the values assigned to the one or more posted comments, calculating one or more user weight values for each of the one or more members, wherein each user weight value represents a total amount of charitable donations donated by each of the one or more members to post descriptive comments;

ranking the one or more user weight values according to the numerical value of the one or more user weight values and storing the one or more user weight values in the memory, wherein the one or more posted comments are ranked in accordance with the ranking of the one or more user weight values;

using a volume of the one or more posted comments about the user, calculating a user weight value for the user, wherein the user weight value further represents a total amount of charitable donations encouraged by the user and wherein a higher user weight value for each of the one or more members results in a higher user weight value for the user; and enabling the one or more members to evaluate of the reliability of the reputation of the user by allowing the one or more members to view the user weight values and the posted comments.

18. The method of claim 17, wherein the one or more user weight values are associated with and displayed for each of the one or more members when each respective one or more members is referenced, wherein the displayed user weight value associated with each of the members is visible to at least one member other than this member.

19. The method of claim 17, wherein the comments are displayed in descending order of the user weight values, with a higher user weight value first.

20. A method of encouraging charitable donations by users of a social network, where users may benefit from donations of money to one or more charities by association with social causes represented by the one or more charities and by public recognition of their donations, comprising:

providing an online social network for users to obtain information about other users, wherein the online social network is accessible to users who use a first computer which is connected to an Internet;

allowing a user to become a member of the online social network by creating a user account and assigning a part of a memory of a second computer to that user account;

collecting user identity data inputted using the first computer by the user, wherein the user identity data comprises the user's name, email address, nickname, date of birth, home address, work address, high school, college, degree, place of employment, work history, maiden name, country of residence, country of birth, or any other identification information;

associating the user identity data with the user account by storing the user identity data in the part of the memory assigned to the user account;

allowing the user to create a user profile containing information about the user by inputting such information using the first computer;

associating the user profile with the user account by storing the user profile information in the part of the memory assigned to the user account;

allowing one or more different users of the online social network to view the user profile;

allowing the one or more different users to deposit money in a prepayment account;

storing the money deposited in the prepayment account in the memory;

allowing the one or more different users to post at least one descriptive comment about the user on the social network if the one or more different users donated, in order to post the at least one descriptive comment about the user, any amount of money deposited in the prepayment account to one or more charities, wherein the user does not benefit financially from the money donated to the one or more charities, and wherein the descriptive comment comprises a word or group of words relating to a character of the user;

storing the posted comment in the memory along with the amount of money donated to the one or more charities with the posting of the comment;

allowing the user to create a poll for the users of the online social network to vote on accuracy of a descriptive comment posted by the one or more different users;

assigning an accuracy value to the descriptive comment based on results of the poll;

calculating a user weight value for the user based on the amount of money donated to the one or more charities by the one or more different users in order to post the at least one descriptive comment about the user, the number of descriptive comments posted by the one or more different users, and the accuracy value of the descriptive comment, wherein the user weight value is a numerical value indicative of the reliability of the reputation of the user, and wherein the user weight value increases with an increase in the amount of money donated to the one or more charities and an increase in the number of descriptive comments posted by the one or more different users;

calculating a different user weight value for each of the one or more different users based on the amount of money donated to one or more charities by the each of the respective one or more different users, wherein the different user weight values increase with an increase in the amount of money donated to the one or more charities, and wherein a higher different user weight value for each of the one or more different users results in a higher user weight value for the user;

allowing the users of the social network to view the descriptive comment posted by the one or more different users and the user weight values and the different user weight values;

allowing users of the social network to view the amount of money donated to the one or more charities associated with the descriptive comment posted by the one or more different users; and enabling the users of the social network to evaluate the reputation of the user based upon numerical values of the user weight value of the user and content of the descriptive comments, wherein the descriptive comments are ranked by the user weight value of the member who posted the comment and displayed.

21. The method of claim 20, wherein, when a user of the online social network votes in a poll on the accuracy of a descriptive comment posted by the one or more different users, an amount of money determined by the user who created the poll is deducted from a prepayment account of the user who created the poll and added to a prepayment account of the user of the online network who votes in the poll.

22. An apparatus for encouraging charitable donations by users of a social network, where users may benefit from donations of money to one or more charities by association with social causes represented by the one or more charities and by public recognition of their donations, comprising:

first allowing means for allowing a user to become a member of the online social network by creating a user account, wherein the online social network is accessible to the user who uses a first computer which is connected to an Internet and a part of a memory of a second computer is assigned to the user account;

collecting means for collecting user identity data inputted using the first computer by the user, wherein the user identity data comprises the user's name, email address, nickname, date of birth, home address, work address, high school, college, degree, place of employment, work history, maiden name, country of residence, country of birth, or any other identification information;

first associating means for associating the user identity data with the user account by storing the user identity data in the part of the memory assigned to the user account;

second allowing means for allowing the user to create a user profile containing information about the user by inputting such information using the first computer;

second associating means for associating the user profile with the user account by storing the user profile information in the part of the memory assigned to the user account;

third allowing means for allowing one or more different users of the online social network to view the user profile;

fourth allowing means for allowing the one or more different users to post at least one descriptive comment about the user on the social network if the one or more different users donate money to one or more charities in order to post the at least one descriptive comment about the user, wherein the user does not benefit financially from the money donated to the one or more charities;

storing means for storing the posted comment in a part of the memory assigned to the posted comment;

third associating means for associating the amount of money donated to the one or more charities with the posted comment by storing the amount of money donated in a part of the memory assigned to the posted comment;

calculating means for calculating a user weight value for the user based on one or more of the amount of money donated to the one or more charities by the one or more different users and the number of descriptive comments posted by the one or more different users, and for calculating a different user weight value for each of the one or more different users based on the amount of money donated to one or more charities by the each of the respective one or more different users, wherein the user weight value is a numerical value indicative of the reliability of the reputation of the user and the different user weight value is a numerical value indicative of the reliability of the reputation of the one or more different users, and wherein the user weight value and the different user weight value are recalculated for each of the one or more different users after a new descriptive comment is posted by the one or more different users, and wherein the user weight value increases with an increase in the amount of money donated to the one or more charities and an increase in the number of descriptive comments posted by the one or more different users, and wherein the different user weight values increase with an increase in the amount of money donated to the one or more charities, and wherein a higher different user weight value for each of the one or more different users results in a higher user weight value for the user;

fifth allowing means for allowing the users of the social network to view the descriptive comment posted by the one or more different users and the user weight values and the different user weight values and for allowing users of the social network to view the amount of money donated to the one or more charities associated with the descriptive comment posted by the one or more different users; and sixth allowing means for enabling the users of the social network to evaluate the reputation of the user based upon numerical values of the user weight value of the user and content of the descriptive comments, wherein the descriptive comments are ranked by the user weight value of the member who posted the comment and displayed.

23. The apparatus of claim 22, further comprising seventh allowing means for allowing the user to send an invitation to the one or more different users to donate money to the one or more charities to post a descriptive comment about the user on the online social network.

24. The apparatus of claim 22, wherein the information about the user comprises employment history information, educational history information or information relating to past accomplishments of the user.

25. The apparatus of claim 22, wherein the descriptive comment comprises a word or group of words describing a character of the user.

26. The apparatus of claim 22, further comprising seventh allowing means for allowing the user to create a poll for the users of the online social network to vote on accuracy of a descriptive comment posted by the one or more different users.

27. The apparatus of claim 22, wherein the amount of money donated to one or more charities by the one or more different users is set by the user.

* * * * *